United States Patent
Zavar et al.

(10) Patent No.: US 10,083,479 B2
(45) Date of Patent: Sep. 25, 2018

(54) SYSTEMS AND METHODS FOR PRODUCT USER INTERFACE DEVELOPMENT

(71) Applicant: Verizon Patent and Licensing Inc., Arlington, VA (US)

(72) Inventors: Mastaneh Zavar, Arlington, VA (US); Allan S Andrew, Ashburn, VA (US); Ramakrishna V Rudhraraju, Frisco, TX (US); Alex Wu, Potomac, MD (US); Surulivel S Pandian, Chennai (IN); Sivaraman Sampath, Ashburn, VA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 441 days.

(21) Appl. No.: 14/730,613

(22) Filed: Jun. 4, 2015

(65) Prior Publication Data

US 2016/0357408 A1   Dec. 8, 2016

(51) Int. Cl.
*G06F 3/00*   (2006.01)
*G06Q 30/06*   (2012.01)
*G06F 3/01*   (2006.01)

(52) U.S. Cl.
CPC ..... *G06Q 30/0641* (2013.01); *G06Q 30/0603* (2013.01)

(58) Field of Classification Search
None
See application file for complete search history.

(56) References Cited

U.S. PATENT DOCUMENTS

| | | | | |
|---|---|---|---|---|
| 8,484,095 | B1 * | 7/2013 | Federighi | G06Q 30/06 705/26.1 |
| 9,373,025 | B2 * | 6/2016 | Amacker | G06F 3/0304 |
| 2002/0073114 | A1 * | 6/2002 | Nicastro | G06Q 10/06 705/36 R |
| 2004/0143516 | A1 * | 7/2004 | Hastie | G06Q 10/087 705/27.1 |
| 2010/0299616 | A1 * | 11/2010 | Chen | G06Q 10/10 715/753 |
| 2010/0306080 | A1 * | 12/2010 | Trandal | G06Q 10/10 705/26.8 |
| 2011/0153447 | A1 * | 6/2011 | Thomas | G06Q 10/06 705/26.3 |
| 2012/0047146 | A1 * | 2/2012 | Balakrishnan | G06F 17/30716 707/748 |
| 2012/0265632 | A1 * | 10/2012 | Patro | G06Q 30/06 705/26.1 |
| 2013/0110671 | A1 * | 5/2013 | Gray | G06Q 30/0643 705/26.8 |
| 2013/0262264 | A1 * | 10/2013 | Karstoft | G06Q 30/0633 705/26.8 |

(Continued)

*Primary Examiner* — Toan Vu

(57) ABSTRACT

Techniques described herein may enable a user to develop a product UI for an enterprise software program in a manner that reduces or eliminates the need for IT development, testing, and deployment. A user-friendly interface may be provided that enables a user to obtain product information describing a product from a product catalog and create interface objects (e.g., labels, textboxes, dropdown boxes, etc.) that use to the product information in a manner that can directly determine how the product information is presented in a product UI. Rules may be added to control how interface objects behave and are used.

20 Claims, 25 Drawing Sheets

Graphical Interface

(56) References Cited

U.S. PATENT DOCUMENTS

| | | | | |
|---|---|---|---|---|
| 2013/0282533 A1* | 10/2013 | Foran-Owens | ....  | G06Q 30/0641 705/27.1 |
| 2013/0332291 A1* | 12/2013 | Perez | ................. | G06Q 30/0623 705/14.73 |
| 2014/0019281 A1* | 1/2014 | O'Dell | ............... | G06Q 30/0643 705/26.1 |
| 2015/0058142 A1* | 2/2015 | Lenahan | ............ | G06Q 30/0631 705/16 |
| 2015/0120487 A1* | 4/2015 | Arthurs | .............. | G06Q 30/0611 705/26.4 |
| 2016/0232558 A1* | 8/2016 | Postrel | ................... | G06Q 30/02 |

* cited by examiner

Product UI Development Tool http:/

*Groups/Products/Features* Product Group Elements

- Vehicles
  + Car
  + Truck
  + Motorcycle
  + Exercise Equipment

| Name | Label | Type | Default Value | Edit | Delete |
|---|---|---|---|---|---|
| Website | Product Website | Hyperlink | Http:/www ... | ✎ | ✗ |
| Business Hours | What are the business hours for delivering the vehicle? | Text Box | 9 AM to 6 PM | ✎ | ✗ |

*New Product Group Element*

Name: [ ]   Type: [ ]

Label: [ ]   Default Description: [ ]

[ Save Element ]   [ Cancel ]

Graphical Interface

| Product Fields | Provisioning Information | Groups/ Dependencies | Preview | | History | |
|---|---|---|---|---|---|---|
| Sequence | Feature Name | Feature Group | Price Impacting | | Edit | Delete |
| 1 | Make | Group 1 | ☒ | | ✏ | ✕ |
| 2 | Model | Group 1 | ☒ | | ✏ | ✕ |
| 3 | Year | Group 2 | ☒ | | ✏ | ✕ |
| 4 | Transmission | Group 2 | ☒ | | ✏ | ✕ |
| 5 | Miles | Group 3 | | | ✏ | ✕ |

Show Product Features: ☒
Show Product Feature Groups: ☐
Show Product Feature Rules & Dependencies: ☐

- Vehicles
  - Car
    - Make
    - Model
    - Year
    - Color
    - Transmission
    - Miles
  + Truck
  + Motorcycle
  + Exercise Equipment ( Add Product Feature )
( Add Product Feature Group )
( Add Product Feature Rules & Dependencies )

( Save )  ( Cancel )

Graphical Interface

Fig. 8

| Product Fields | Provisioning Information | Groups/ Dependencies | Preview | History |
|---|---|---|---|---|

| Sequence | Feature Name | Feature Group | Price Impacting | Edit | Delete |
|---|---|---|---|---|---|
| 1 | Make | Feature Group 1 | ☒ | ✎ | ✗ |
| 2 | Model | Feature Group 1 | ☒ | ✎ | ✗ |
| 3 | Year | Feature Group 2 | ☒ | ✎ | ✗ |
| 4 | Transmission | Feature Group 2 | | ✎ | ✗ |
| 5 | Miles | Feature Group 3 | ☒ | ✎ | ✗ |

Add New Product Feature

Feature Name: [_____] ▷  Feature Group: [_____] ▷

Allow Disconnect on Change Order  ● Yes  ○ No   Tool Tip: [_____]

Allow Upgrade on Change Order  ○ Yes  ● No

Show Advanced Options ☐

[ Save ]  [ Cancel ]

- Vehicles
  -Car
    - Make
    - Model
    - Year
    - Color
    - Transmission
    - Miles
  + Truck
  + Motorcycle
+ Exercise Equipment Graphical Interface

| Sequence | Feature Group Name | Price Impacting | Edit | Delete |
|---|---|---|---|---|
| 1 | Feature Group 1 | X | ✎ | X |
| 2 | Feature Group 2 | X | ✎ | X |
| 3 | Feature Group 3 | X | ✎ | X |

Add New Feature Group

Group Name: [ ]
Show Advanced Options: [ ]
Price Impacting: ● Yes ○ No
Group Sequence: [ ▽ ]

[Save] [Cancel]

- Vehicles
 - Car
  - Make
  - Model
  - Year
  - Color
  - Transmission
  - Miles
 + Truck
 + Motorcycle
+ Exercise Equipment Product Fields | Provisioning Information | Groups/Dependencies | Preview | History Product UI Development Tool Graphical Interface

| Product Fields | Provisioning Information | Groups/Dependencies | Preview | | History | |
|---|---|---|---|---|---|---|
| Rule Type/Group/Feature(s) | Impacting Feature(s) | Min-Max | Rule Type | Edit | Delete |
| - Inclusive Required<br>　Make | Model | - | Inclusive Required | ✎ | ✗ |
| - Inclusive Required<br>　- Feature Group 3<br>　　Miles | - | 0-300,000 | Required | ✎ | ✗ |

Show Product Features: ☐
Show Product Feature Groups: ☐
Show Product Feature Rules & Dependencies: ☒

- Vehicles
  - Car
    - Make
    - Model
    - Year
    - Color
    - Transmission
    - Miles
  + Truck
  + Motorcycle
+ Exercise Equipment

[ Add Product Feature ]
[ Add Product Feature Group ]
[ Add Product Feature Rules & Dependencies ]

[ Save ]   [ Cancel ]

Graphical Interface

Fig. 12

Product UI Development Tool http://

- Vehicles
  - Car
    - Make
    - Model
    - Year
    - Color
    - Transmission
    - Miles
  + Truck
  + Motorcycle
  + Exercise Equipment

| Product Fields | Provisioning Information | Groups/Dependencies | Preview | History |
|---|---|---|---|---|

| Rule Type/Group/Feature(s) | Impacting Feature(s) | Min-Max | Rule Type | Edit | Delete |
|---|---|---|---|---|---|
| - Inclusive Required<br>Make | Model | - | Inclusive Required | ✎ | × |
| - Inclusive Required<br>- Feature Group 3<br>Miles | - | 0-300,000 | Required | ✎ | × |

Add Feature Rules

Parent Feature Name: ▽
Feature Group Name:
Impacting Feature Name: ▽

Rule Type: ▽

[Save] [Cancel]

Graphical Interface

Product UI Development Tool http://

- Vehicles
  - Car
    - Make
    - Model
    - Year
    - Color
    - Transmission
    - Miles
  + Truck
  + Motorcycle
+ Exercise Equipment

| Product Fields | Provisioning Information | Groups/Dependencies | Preview | History |
|---|---|---|---|---|

| Sequence | Feature Field Group Name | Price Impacting | Edit | Delete |
|---|---|---|---|---|
| 1 | Feature Field Group 1 | X | ✎ | X |
| 2 | Feature Field Group 2 | X | ✎ | X |

Show Product Features Field: ☐
Show Feature Field Groups: ☒
Show Feature Field Rules & Dependencies: ☐

[ Add Product Feature Field ]

[ Add Feature Field Group ]

[ Add Feature Field Rules & Dependencies ]

[ Save ]  [ Cancel ]

Graphical Interface

Fig. 18

| Parent Specification Name | Parent Field Value | Child Specification Name | Child Field Value | Edit | Delete |
|---|---|---|---|---|---|
| Exterior Color | Black | Interior Color | Black | ✎ | ✗ |

- Vehicles
- - Car
- - - Make
- - - Model
- - - Year
- - - Color
- - - Transmission
- - - Miles
- + Truck
- + Motorcycle
- + Exercise Equipment Show Product Features Field: ☐
Show Feature Field Groups: ☐
Show Feature Field Rules & Dependencies: ☒

Add Product Feature Field
Add Feature Field Group
Add Feature Field Rules & Dependencies Save    Cancel Graphical Interface

Fig. 19

Products UI

Product Section

Product Type: | Vehicles ▽
Product: | Car ▽
Quantity: | 1

Product Website:
http:/www ...

Business Hours for Delivery:
9AM to 6PM

Product Configuration Section

Make: [ - ▽]
Model: [ - ▽]
Year: [ - ] [YYYY]
Color:
Exterior: [ - ▽]
Interior: [ - ▽]  Tool Tip
Transmission: ○ Standard  ● Manual
New or Used: ● New  ○ Used
Miles: [ - ]

Fig. 22

SYSTEMS AND METHODS FOR PRODUCT USER INTERFACE DEVELOPMENT

BACKGROUND

Businesses and other types of organizations may use enterprise software programs that enable the organization to catalog products, generate price quotes, issue contracts, generate billings, and execute the sale of products and services (products and services may be referred to herein simply as products). However, introducing new products into an enterprise software program may require significant time, money, and other resources. For instance, before a marketing department can begin selling a new product, an information technology (IT) team must often develop, test, and deploy a product user interface (UI) so that the marketing department can use the enterprise software program to take product orders, determine pricing and contracting, and generate bills with respect to the product. The burden of modifying an enterprise software program in such a manner may limit the productivity and profitability of the organization, and in some circumstance, may amount to such a burden so as to deter the organization from deciding to offer certain products or services for sale.

BRIEF DESCRIPTION OF THE DRAWINGS

FIG. 5 illustrates an example graphical interface for creating product group elements within a product UI development tool;

FIG. 6 illustrates an example graphical interface for defining a product within a product UI development tool;

FIG. 8 illustrates an example graphical interface for defining product features within a product UI development tool;

FIG. 9 illustrates an example graphical interface for adding a product feature to a product within a product UI development tool;

FIG. 11 illustrates an example graphical interface for adding a product feature group within a product UI development tool;

FIG. 12 illustrates an example graphical interface for displaying product feature rules and dependencies within a product UI development tool;

FIG. 13 illustrates an example graphical interface for adding product feature rules and dependencies within a product UI development tool;

FIG. 14 illustrates an example graphical interface for defining a product feature fields within a product UI development tool;

FIG. 17 illustrates an example graphical interface for displaying feature fields groups within a product UI development tool;

FIG. 18 illustrates an example graphical interface for displaying feature field rules and dependencies within a product UI development tool;

FIG. 19 illustrates an example graphical interface for adding a feature field dependency within a product UI development tool;

FIG. 22 illustrates an example product UI;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide techniques for developing a product UI for an enterprise software program by providing a user with a product UI development tool for developing the product UI. The product UI development tool may be used to import product information from a product catalog. The product information may include a description of one or more product groups (e.g., vehicles, exercise equipment, etc.), products within the product groups (e.g., ear cars, trucks, motorcycles, etc.), product features associated with the products (e.g., make, model, color, etc.), and/or other types of product information.

The product information may be used to create interface objects, such as textboxes, dropdown boxes, radio buttons, and other types of interface objects, along with rules and dependencies that dictate how the interface objects are to be used and/or how the interface objects relate to one another. The interface objects may be organized into a product UI that is compatible with the enterprise software program. The product UI development tool may be flexible enough to apply to a diverse range of products and services yet user-friendly enough to reduce or illuminate the need for IT development, testing, and deployment.

Figure 1:
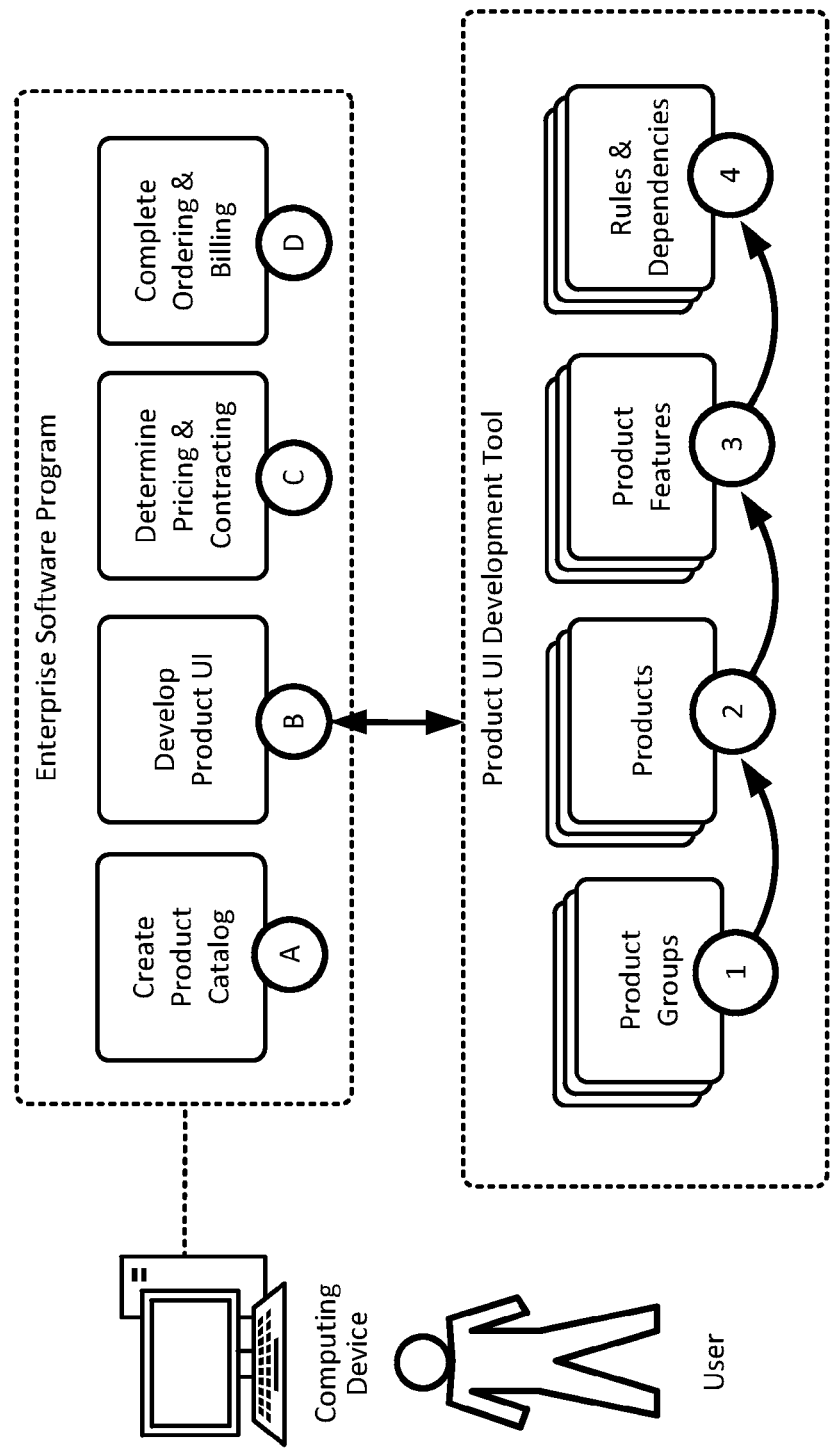
FIG. 1 illustrates an example overview of an implementation described herein.

FIG. 1 illustrates an example overview of an implementation described herein. As shown in FIG. 1, a computing device (e.g., a laptop computer, a desktop computer, etc.) may include an enterprise software program capable of creating a product catalog, developing a product UI based on the product catalog, using the product UI to determine pricing and contracting for the sale of products, and completing ordering and billing for the sale of products. In some implementations, the enterprise software program may be used to perform one or more additional and/or alternative functions. As such, the enterprise software program may provide an end-to-end software solution for bringing a product to market.

The enterprise software program may include a product UI development tool for developing the product UI. The product UI development tool may import product groups, products, product features, and/or one or more other types of product information from the product catalog, and enable a user to create interface objects (e.g., textboxes, dropdown menus, etc.) for the product groups, products, and product features. The product UI development tool may also, or alternatively, enable a user to create rules and dependencies for the interface objects and generate a fully functional product UI.

For instance, assume that a user is in the business of selling vehicles. In such a scenario, the user may define a product group called vehicles and products within the vehicle group as cars, trucks, motorcycles, etc. The user may further define product features of each vehicle such as make, model, color, mileage, and so on, and may establish rules between one or more of the product features. For example, if a textbox for indicating the mileage of a car should only have numeric values, then a rule may be implemented that allows only numeric values to be entered into the textbox. As another example, if cars with a red exterior must also have a red interior, then a dependency may be created to ensure that cars with red exteriors also have a red interiors. As such, the product UI development tool may be used to develop a product UI, and as mentioned above, the product UI may be used in determining the price of products, establishing contracts for the sale of products, creating orders for products, generating bills for the sale of products, and/or one or more other tasks associated within an enterprise software program.

Figure 2:
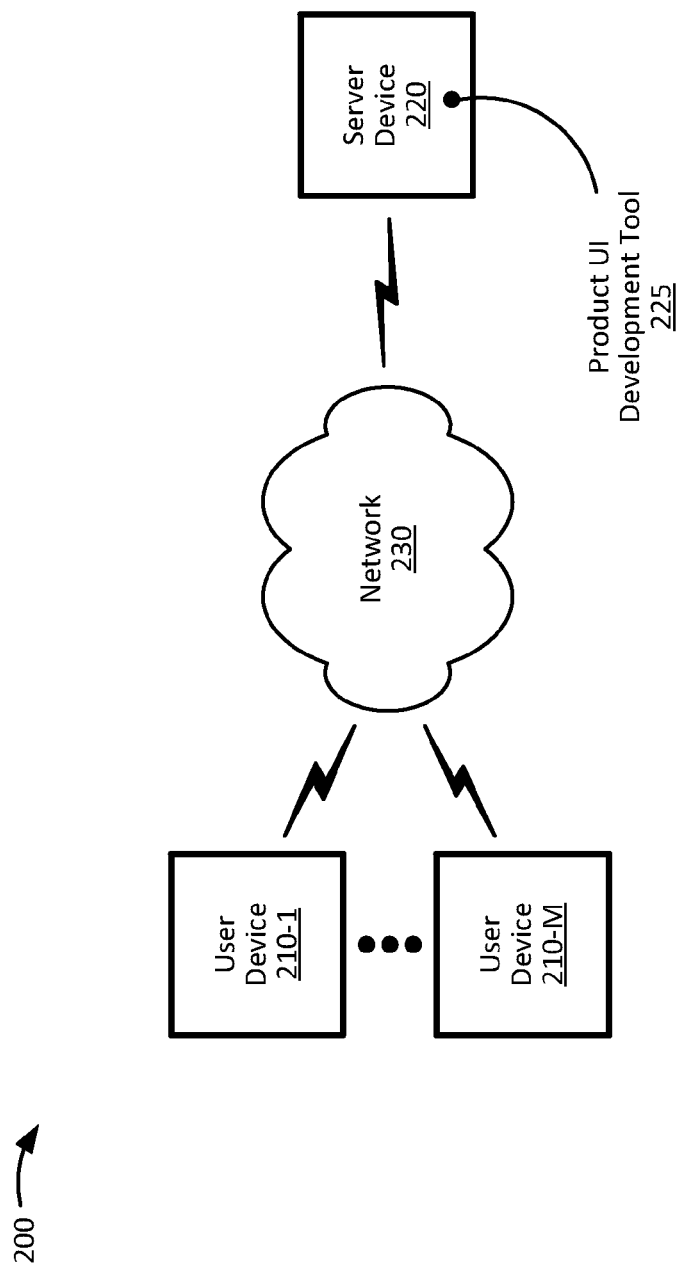
FIG. 2 illustrates an example environment in which systems and/or methods, described herein, may be implemented.

FIG. 2 illustrates an example environment in which systems and/or methods, described herein, may be implemented. As shown in FIG. 2, environment 200 may include user devices 210-1 through 210-M (where M is an integer greater than or equal to 1), server device 220, and network 230.

User device 210 may include a device capable of communicating via a network, such as network 230. For example, user device 210 may include one or more computing devices, such as a laptop computer, a desktop computer, a table computer, etc. User device 210 may be capable of communicating with server device 220 to accomplish one or more tasks. For instance, user device 210 may communicate with service device 220 to access an enterprise software program installed on service device 220 and/or to use product UI development tool 225 to create a product UI.

Server device 220 may include one or more computing devices, such as a server device or a collection of server devices. As shown, server device 220 may include product UI development tool 225, which may be part of an enterprise software program. As described above, the enterprise software program may be capable of creating a product catalog, developing a product UI (e.g., via product UI development tool 225), determining the price of a product in preparation for issuing a price quote, establishing contracts for the sale of products, creating orders for products, generating bills for the sale of products, and/or one or more other tasks.

Network 230 may include one or more wired and/or wireless networks. For example, network 270 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 230 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment 200 is not limited to what is shown in FIG. 2. In practice, environment 200 may include additional devices and/or networks, fewer devices and/or networks, different devices and/or networks, or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
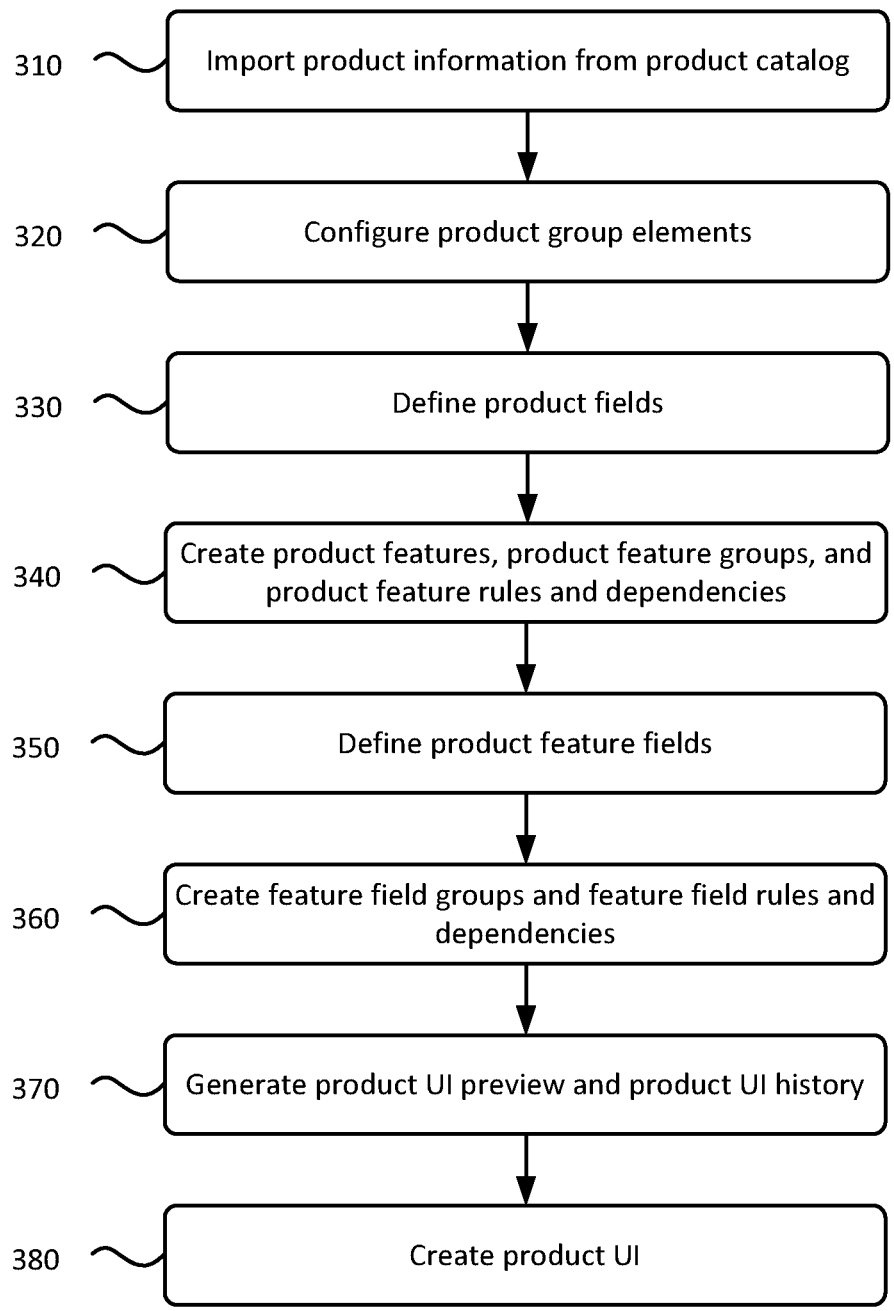
FIG. 3 illustrates a flowchart of an example process for developing a product UI.

FIG. 3 illustrates a flowchart of an example process 300 for developing a product UI. In some implementations, process 300 may be performed by server device 220 (e.g., by product UI development tool 225). In some implementations, some or all of the blocks of process 300 may be performed by one or more other devices.

As shown in FIG. 3, process 300 may include importing product information from a product catalog (block 310). For example, server device 220 may import product information from a product catalog into product UI development tool 225. The product information may include information describing one or more product groups, products, and/or product features.

Figure 4:
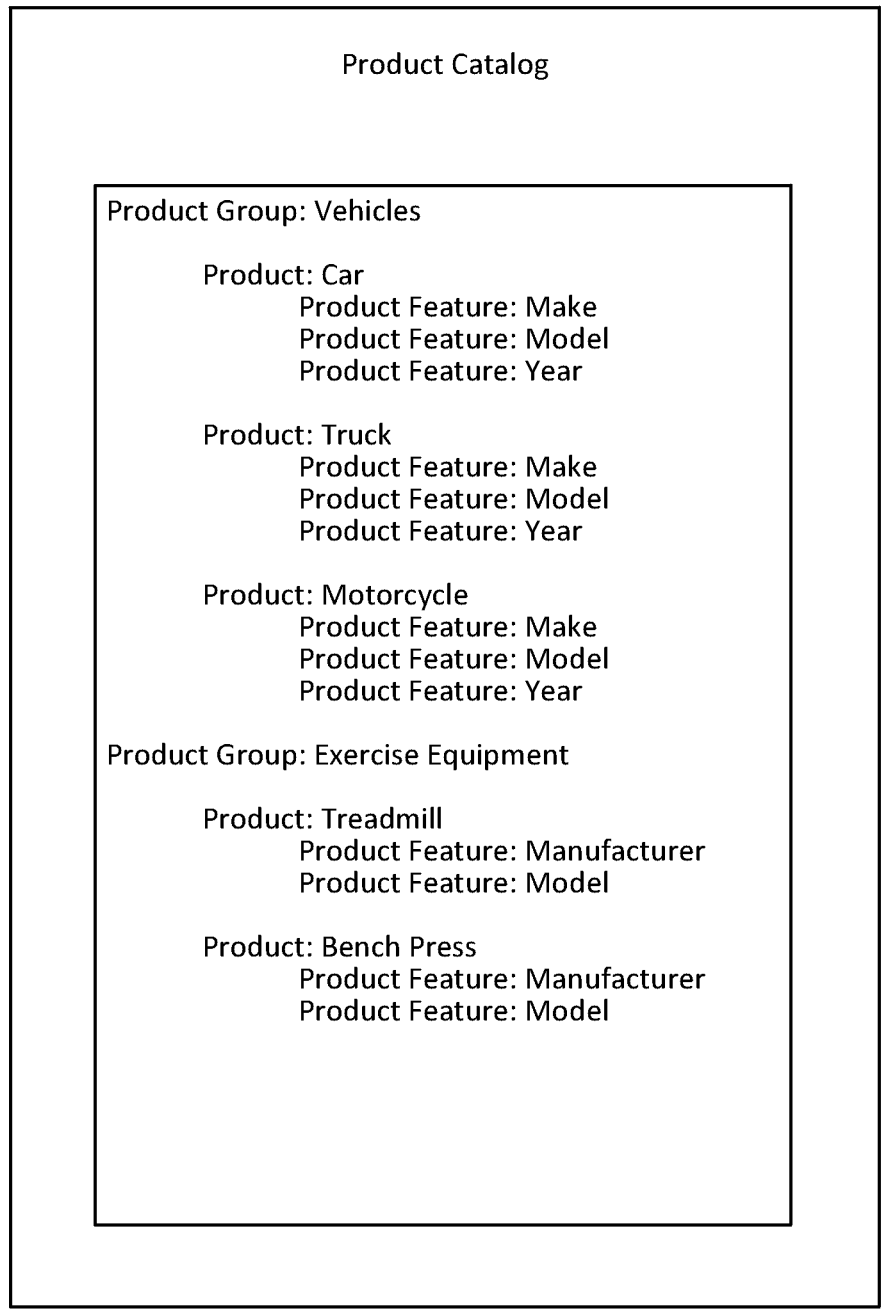
FIG. 4 illustrates an example of a product catalog.

FIG. 4 illustrates an example of a product catalog. As shown, a product catalog may include one or more types of product information, such as product groups, products, and/or product features. For instance, if an organization is in the business of selling vehicles and exercise equipment, the product group information may include Vehicles and Exercise Equipment. The product information may include types of vehicles and exercise equipment, such as Car, Truck, Motorcycle, etc., under Vehicles, and types of exercise equipment under the Exercise Equipment, such as Treadmill, Bench Press, etc. The product features for the each product may include one or more relevant attributes, such as Make, Model, and Year under the Car product, and Manufacturer and Model under the Treadmill product.

In the example illustrated in FIG. 4, the product information is organized according to a particular format. However, in some implementations, the product information may be organized in accordance with a different scheme, an alternative scheme, and/or an additional scheme. For instance, in some implementations, the product information may be organized into textboxes that are titled according to whether the textbox pertains to a product group, a product, or a product feature. Additionally, or alternatively, while the product information of FIG. 4 is limited to product groups, products, and product features, product information may include different, additional, and/or alternative type of information. For example, product information may include specific types of car makes (e.g., Ford, Toyota, Honda, etc.) and/or car models (e.g., Civic, Accord, etc.). In some implementations, the form and substance of the product catalog may depend on a computer program designed for creating product catalogs. Accordingly, the present disclosure includes product catalogs of varying form, type, content, etc., and is not limited to the product catalog of FIG. 4.

Returning to FIG. 3, process 300 may include configuring product groups (block 320). For example, server device 220 may define a product group based on product information imported from a product catalog. The product group may include a product group title that may be one or more words that are indicative of the products intended to be in the product group. For instance, if the products intended to be in a particular product group include cars, trucks, and motorcycles, the product group title may be Vehicles, Land Vehicles, or some other type of word or phrase that describes cars, trucks, and motorcycles.

The product group may also, or alternatively, include one or more product group elements. A product group element may include one or more attributes, such as a name, UI object type, a default value, and/or one or more other types of attributes. A product group element may be applied to one or more products added to the product group. For instance, if multiple product UIs for products within a product group require a particular interface object, such as a hyperlink to a company webpage, a user may create the interface object as a product group element and then apply the product group element to one or more of the product simultaneously.

FIG. 5 illustrates an example graphical interface for creating product group elements within product UI development tool 225. As shown, the graphical interface may include a collapsible menu that includes one or more product groups (e.g., Vehicles and Exercise Equipment) and products (e.g., Car, Truck, Motorcycle, etc.). The graphical interface may display a table of product group elements corresponding to a selected product group (Vehicles). Each product group element in the table may include one or more attributes, such as a name of the product group element, a label of the product group element, a product group element type, a default value, and/or one or more other types of attributes.

The graphical interface may also provide options for editing and or deleting a particular product group element. Additionally, or alternatively, the graphical interface may provide a way to add new product group elements by specifying the name, the label, the type, a default value, etc. of the new product group element. As mentioned above, a product group element may be applied to one or more products with a product group, thus providing an expeditious solution to incorporating a common interface object into multiple product UIs.

Returning to FIG. 3, process 300 may include defining product fields (block 330). For example, server device 220 may define one or more products. In some implementations, a product may include a product name, one or more product features, and/or one or more product fields. The product name may be the name of the product in the product catalog and/or the product UI development tool 225, a product feature may include one or more characteristics of the product, and a product field may one or more UI interface objects associated with the product.

For instance, if a product is a car, the product name may be Car, the features corresponding to the car may include the Make, Model, Year, etc., and the product fields for the car may include a text box for inputting identification information (e.g., a vehicle identification number (VIN)) of the car. In some implementations, whether a particular characteristic, like a VIN number, is presented in the product UI development tool 225 as a product feature or a product field may depend on one or more factors, such as whether the characteristic is imported from the product catalog automatically or whether the characteristic is manually entered as a product field. Examples for defining a product are discussed below with reference to FIGS. 6-8.

Figure 6:
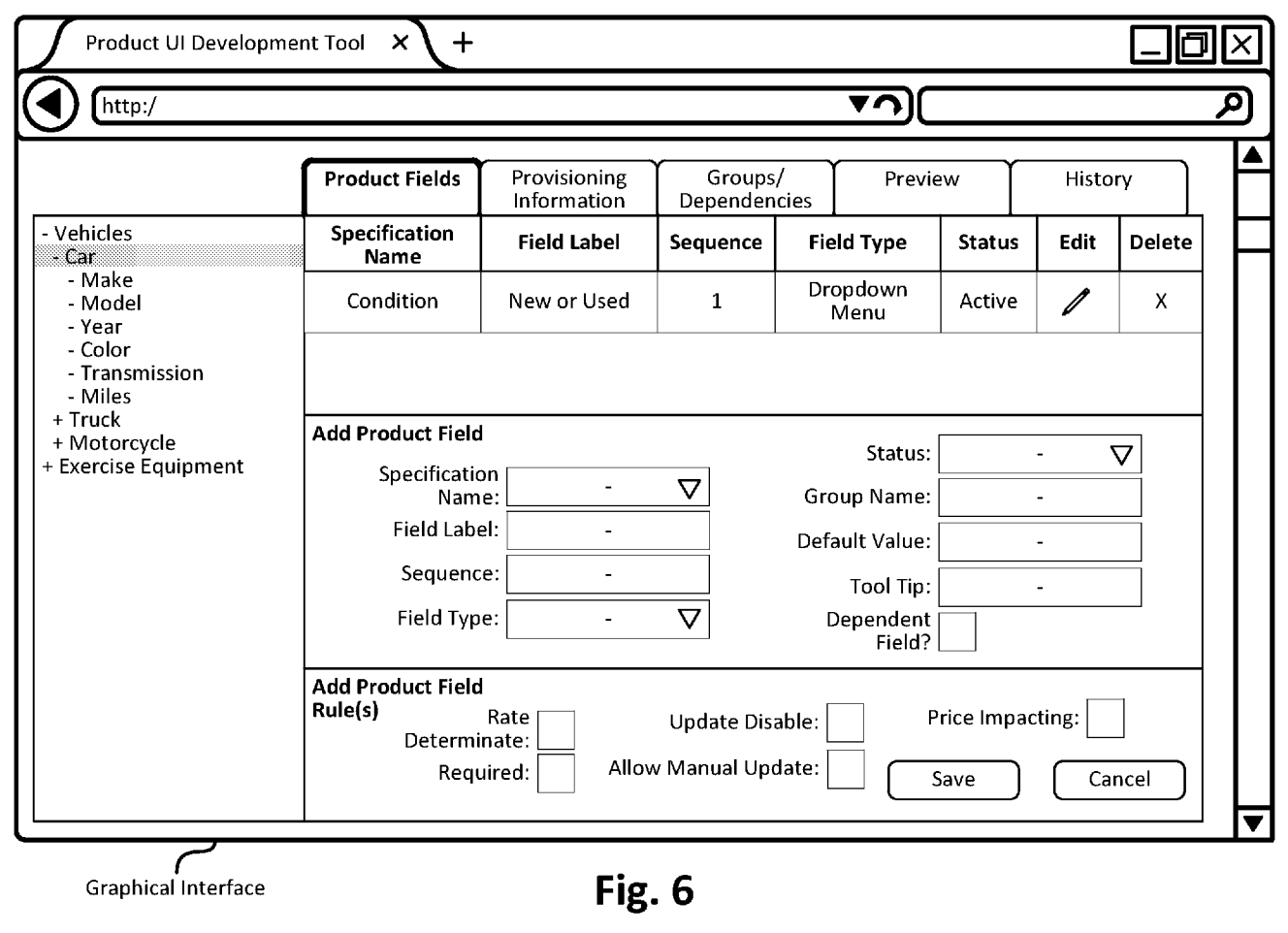

FIG. 6 illustrates an example graphical interface for defining a product within a product UI development tool 225. As shown, the graphical interface may include a collapsible menu that includes one or more product groups (e.g., Vehicles, Exercise Equipment, etc.), products (e.g., Car, Truck, Motorcycle, etc.), and product features (e.g., Make, Model, Year, etc.). The graphical interface may display a table of product fields corresponding to a selected product (Car). The product fields can be grouped as either Price Impacting or non Price impacting. Each product field in the table may include one or more attributes, such as a specification name, a field label, a sequence, a field type, a status, and/or one or more other types of attributes.

The specification name may include a name of a product characteristic in the product catalog. In some implementations, the specification name may operate as an identifier between the product development UI tool and the product catalog. The field label may include a word or phrase that will be used to present the product field in the corresponding product UI. The sequence may indicate where the product field will be located in the product UI. The filed type may include the type of interface object (e.g., textbox, dropdown menu, checkbox, etc.) that will be presented in the product UI along with the field name. The status may indicate if and/or how the product field will be displayed in the product UI. For instance, an active status may indicate that the product field will be visible and fully operational, whereas an inactive status may indicate that the product field will not be visible, that the product field will be grayed out, etc. As an example, the product field illustrated in FIG. 6 includes a dropdown menu entitled New or Used and for indicating whether or not the car is new or used. The dropdown menu of the product field may be automatically populated with the choices of New and Used because of the reference made to the product catalog via the specification name of Condition.

Additionally, or alternatively, the product UI development tool may include a section for adding a new product field by inputting a specification name, field label, sequence, type, and status. A user may also, or alternatively, specify a group name for organizing one or more product fields into logical groups, a default value that will appear when the product field is displayed in the product UI, a tool tip for assisting a user in understanding and/or interacting with the product field within the product UI, whether the product field is dependent on another product field, and/or more one other types of attributes. In some implementations, indicating that the product field is dependent on another product field may cause the product UI development tool for additional information regarding the dependency, such as one or more other product fields involved in the dependency, one or more product field groups involved in the dependency, one or more product field values involved in the dependency, etc.

In some implementations, the product UI development tool may operate to verify or validate one or more attributes of a new product field. For instance, if a user attempts to add a product field with a specification name that conflicts with (e.g., is the same as) the specification name of an existing product field, the product UI development tool may prevent the addition of the new product field. Additionally, or alternatively, in scenarios where a product will only be available at a specific location and/or a specific period of time, the product UI development tool may verify that new product fields with availability and/or location information cohere with the availability and/or location constraints of the product. In some implementations, the product UI development tool may verify or validate attributes of a product field in one or more ways, such as comparing the attributes of the new product field with attributes of existing product fields and/or by comparing the attributes of the new product field with information contained in the product catalog. In some implementations, the product UI development tool may display a message informing the user that the new product field was not added and/or describing the reason for not adding the new product field.

A user may also, or alternatively, specify one or more rules for the product field. For instance, if the product element is a necessary in the product UI, the user may indicate that the product element is required. If the product element may be modified later (e.g., when the product is being ordered or the price is being negotiated), then the user may indicate that a manual update is allowed; however, if the product element cannot be modified later, then the user may indicate that updates are disabled. Additionally, or alternatively, if the product element will necessarily impact the final price quote of the product (e.g., there is no room to negotiate the cost of the feature or whether the feature affects the price of the product), the user may indicate that the product element is rate determinant. Further, a user may indicate whether the product field is price impacting or non-price impacting by selecting, or not selecting, the price impacting checkbox.

Figure 7:
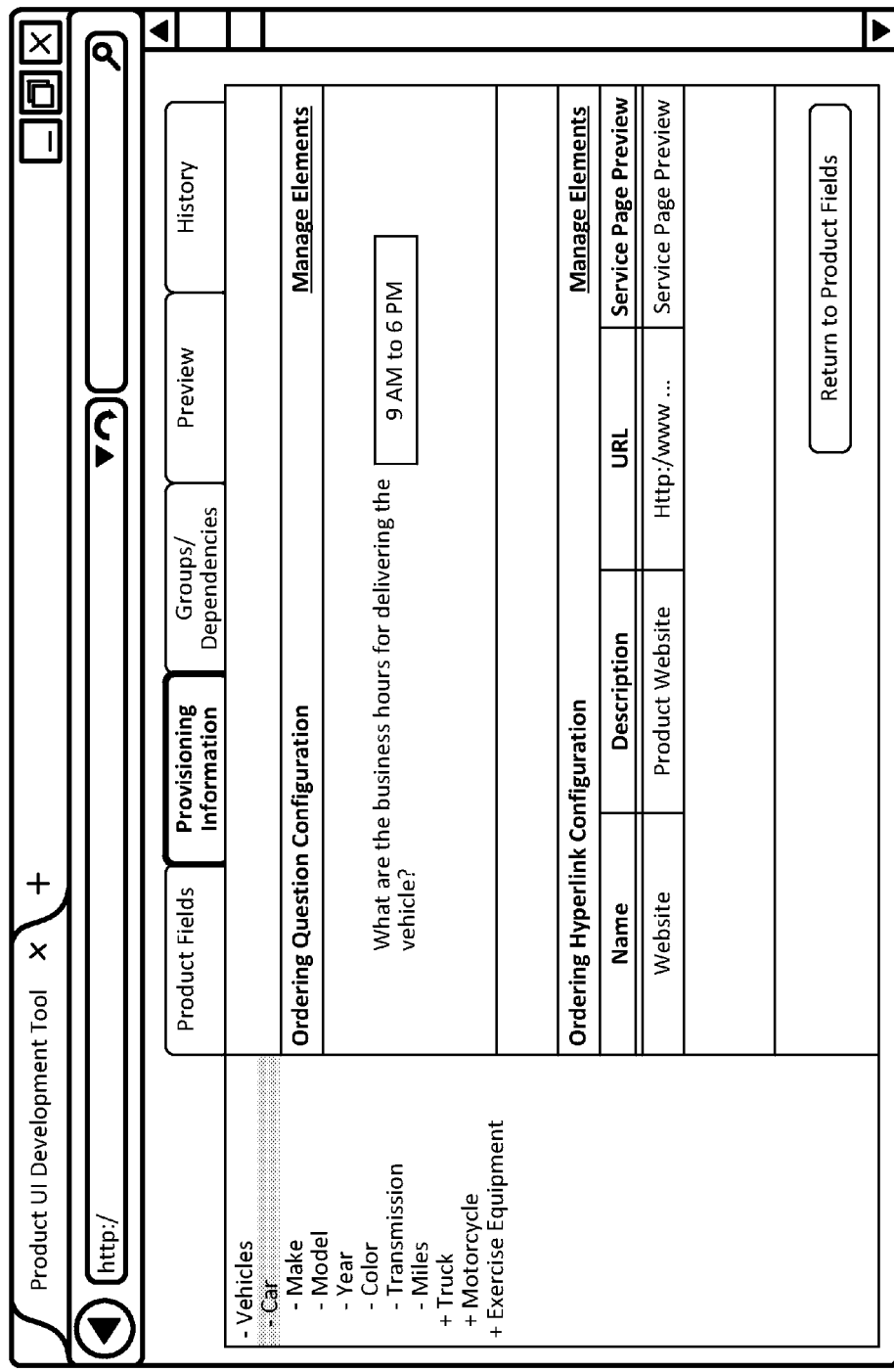
FIG. 7 illustrates an example graphical interface for defining provisioning information for a product within a product UI development tool.

FIG. 7 illustrates an example graphical interface for defining provisioning information for product within product UI development tool 225. As shown, a Provisioning Information tab within the product UI development tool may include product fields that are divided into two sections. One section is designated for ordering questions (e.g., questions that should be answered in order to complete a sale of the product), and the other section is designated for ordering hyperlinks (e.g., a hyperlink that describes the product being sold, the conditions for selling the product, etc.). The ordering question and the ordering hyperlink may have been added to the product from the product group elements described above with respect to FIG. 5, and additional ordering questions and/or ordering hyperlinks may be added to the product by selecting the corresponding Manage Elements link for either section.

Returning now to FIG. 3, process 300 may include creating product features, product feature groups, and product feature rules and dependencies (block 340). For example, server device 220 may create one or more product features that are associated with a product. Each product feature may be associated with a product group and/or participate in one or more product feature rules or dependencies. In some implementations, product feature groups, and/or product feature rules and dependencies may be imported from a product catalog. Additionally, or alternatively, product feature groups and/or product feature rules and dependencies may be created by a user within product UI development tool 225.

For example, server device 220 may create product feature groups that are logically associated one or more product features. Doing so may serve one or more purposes, such as highlighting the relationships between two or more product features for organizational and management purposes, creating rules and dependencies that are applicable to an entire group of product features, grouping similar product features within a product UI, and more. Additionally, or alternatively, server device 220 may create rules and/or dependencies between two or more product features and/or two or more product features groups. For example, if a Model feature (e.g., Civic, Accord, etc.) is dependent upon a Make feature (Ford, Toyota, Honda, etc.), a dependency may be crated such that interface objects associated with the Model feature may not be available until the interface objects associated with the Make feature are satisfied within the product UI (e.g., until the make of the car is selected). As another example, a rule may be applied to a product features, such the Miles product feature, such that a user can only enter numeric values in an interface object corresponding to the product feature. FIGS. 9-14 provide several examples of graphical interfaces that relate to creating product field groups and product field rules and dependencies.

FIG. 8 illustrates an example graphical interface for defining product features within product UI development tool 225. As shown, a Groups/Dependencies tab within product UI development tool 225 may include a table of product features (e.g., Make, Model, Year, etc.) corresponding to a selected product (e.g., Car). Each entry in the table of product features may include one or more of a variety of attributes, such as a sequence, a feature name, a feature group, an indication of whether the product feature is price impacting, and more. The sequence of a product feature may determine the location in which the product feature is presented in the product UI.

The feature name of a product feature may include the name of the product feature in the product catalog. The feature group of a product feature may include the group of features to which the product feature is associated, and the price impacting checkbox may indicate whether the product feature is price impacting or non-price impacting. As discussed above with respect to products, organizing product features into groups and/or as price impacting or non-price impacting may facilitate the product UI development process by maintain organization when a product UI includes a large number of product features.

The Groups/Dependencies tab may also, or alternatively, include one or more checkboxes for showing product features, product feature groups, and/or product feature rules. These checkboxes may cause the product UI development tool to display different types of information in the group/dependencies tab. For instance, as only the checkbox for showing product features is selected in FIG. 8, the table in FIG. 8 includes only product features added to the product. Additionally, or alternatively, the Groups/Dependencies tab may include buttons for adding new product features, adding new product feature groups, and/or adding new product feature rules. As such, new product features, new product feature groups, and/or new product features rules may be added to the product.

FIG. 9 illustrates an example graphical interface for adding a product feature to a product within product UI development tool 225. As shown, a product feature may be added to a product by specifying a feature name for the product feature and/or a feature group for the product feature. In some implementations, the feature name and/or the feature group may be manually entered by a user. Additionally, or alternatively, inputting a feature name and/or a feature group may include selecting a dropdown menu option that is populated by feature names and/or feature groups included in the product catalog. Additional attributes that may be specified for the product feature may include whether to allow disconnect (e.g., whether to enable a user to disable the product feature in the product UI), whether to allow an upgrade (e.g., whether to enable a user to upgrade the product feature in the product UI), etc. Additionally, or alternatively, selecting the advanced options checkbox may enable the user to specify one or more additional attributes for the product feature.

Figure 10:
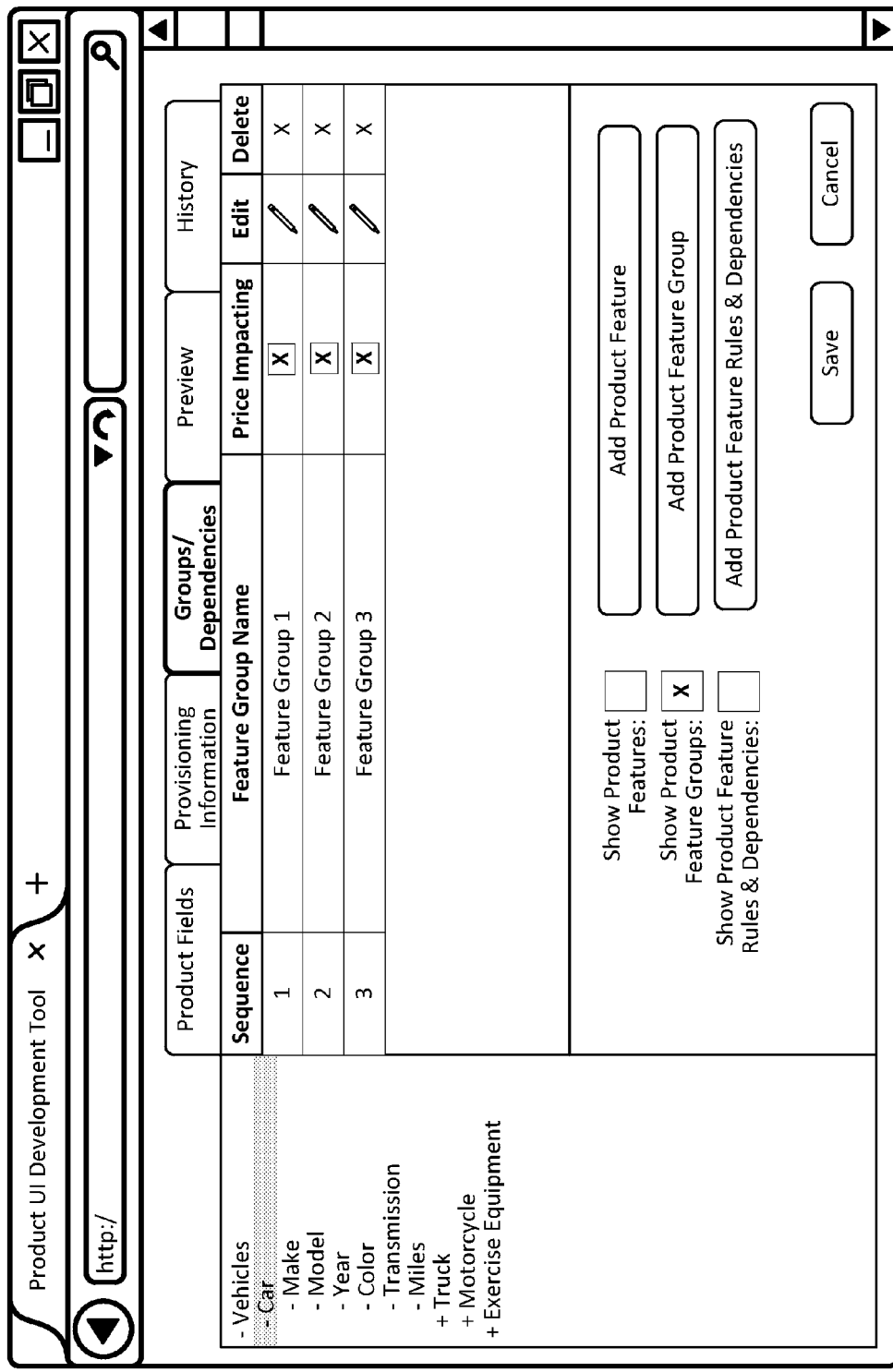
FIG. 10 illustrates an example graphical interface for displaying product feature groups within a product UI development tool.

FIG. 10 illustrates an example graphical interface for displaying product feature groups within product UI development tool 225. As shown, the Groups/Dependencies tab within may include a table of product features groups (e.g., Feature Group 1, Feature Group 2, etc.) corresponding to a selected product (e.g., Car). Each entry in the table of product feature groups may include one or more of a variety of attributes, such as a sequence, a feature group name, an indication of whether the product feature group is price impacting, and more. The sequence of a product feature group may determine the location in which the product feature group is presented in the product UI (e.g., the position of the product features within the product feature group relative to product features of other product feature groups). The feature group name may include the name of the product feature group, and the price impacting checkbox may indicate whether the product feature group (e.g., the features within the product feature group) is price impacting or non-price impacting.

The Groups/Dependencies tab may also, or alternatively, include one or more checkboxes for showing product features, product feature groups, and/or product feature rules. As only the checkbox for showing product feature groups is selected in FIG. 10, the table in FIG. 10 includes only product feature groups added to the product. Additionally, or alternatively, the Groups/Dependencies tab may include buttons for adding product features, adding product feature groups, and/or adding product feature rules.

FIG. 11 illustrates an example graphical interface for adding a product feature group within product UI development tool 225. As shown, a feature group name may be manually entered by a user, which may include selecting a dropdown menu option that is populated by feature group names and/or feature groups included in the product catalog. One or more additional attributes may be specified for the product feature, such as whether the product feature group is price impacting or non-price impacting, the sequence for the product feature group, etc. Selecting the advanced options checkbox may enable the user to specify one or more additional attributes for the product feature group.

FIG. 12 illustrates an example graphical interface for displaying product feature rules and dependencies within product UI development tool 225. As shown, the Groups/Dependencies tab may include a table of product feature rules and dependencies corresponding to a selected product (e.g., Car). Each entry in the table of product feature rules and dependencies may include one or more of a variety of attributes, such as a Rule Type/Group/Feature, an Impacting Feature, and a Type. The Rule Type/Group/Feature attribute may indicate the type of rule, the product feature group (if applicable), and the product feature to which the rule or dependency pertains. The Impacting Feature attribute may include the product feature that is affected by the rule or dependency. The product feature that drives the rule or dependency may be referred to as the parent product feature, and the product feature that is affected by the rule or dependency may be referred to as the child feature. The Rule Type attribute may indicate the relationship created by the rule or dependency between the parent feature and the child feature.

For instance, FIG. 12 includes an inclusive required rule between the parent feature of Make and the child feature of Model, which may mean that the child feature is required but, may only be inputted after the parent feature has been inputted (e.g., that the model of the car may only be selected after the make of the car has been selected). As another example, FIG. 12 includes a rule for the product feature Miles of Feature Group 3 to include a value between the range of 0 and 300,000. The Rule Type is Required, which may mean that a user must input the mileage of the car being sold.

Other examples of rule types may include a mutually exclusive rule, a minimum/maximum features rule, and/or an inclusive optional rule. A mutually exclusive rule may include a scenario where a certain product feature from among many possible product features may be selected. For example, a car may have several possible features such as navigation, video entertainment, etc.; however, the feature of navigation may only be selected if the feature of video entertainment is not selected. A minimum/maximum features rule may include a scenario where multiple product features may be selected; however, the number of selected product features must be between a minimum quantity (e.g., 1) and a maximum quantity (e.g., 5). An inclusive required rule may include a scenario where a child feature is only available and required for selection when a corresponding parent feature is selected; however, selecting the child feature in this case is required. In some implementations, additional and/or alternative product features may be available to a user.

The Groups/Dependencies tab may also, or alternatively, include one or more checkboxes for showing product features, product feature groups, and/or product feature rules and dependencies. For instance, as only the checkbox for showing product feature rules and dependencies is selected in FIG. 12, the table in FIG. 12 includes only product feature rules and dependencies added to the product. Additionally, or alternatively, the Groups/Dependencies tab may include buttons for adding new product features, adding new product feature groups, and/or adding new product feature rules.

FIG. 13 illustrates an example graphical interface for adding product feature rules and dependencies within product UI development tool 225. As shown, product feature rules and dependencies may be added to a product by specifying a parent feature name that drives the product feature rule or dependency, a feature group name corresponding to a product feature group, an impacting feature name, and a rule type. The dropdown boxes for the parent feature name and the impacting feature name may be populated from the product catalog, whereas the dropdown box for the rule type may be a list of rule types made available by the product development UI tool itself. In some implementations, additional attributes may be specified by the user, such as a maximum number and/or minimum number for rules such as a mutually exclusive rule, minimum/maximum rule, and/or another type of product feature rule or dependency.

Returning now to FIG. 3, process 300 may include defining product feature fields (block 350). For example, server device 220 may define product feature fields corresponding to one or more product features. In some implementations, server device 220 may define a product feature field by specifying one or more attributes, such as a source within the product catalog for populating the product feature field, a field label for labeling the product feature field in the product UI, a filed type corresponding to a type of interface object (e.g., a textbox, dropdown menu, textbox, etc.), and/or a status to indicate whether the product feature field is active.

Figure 14:
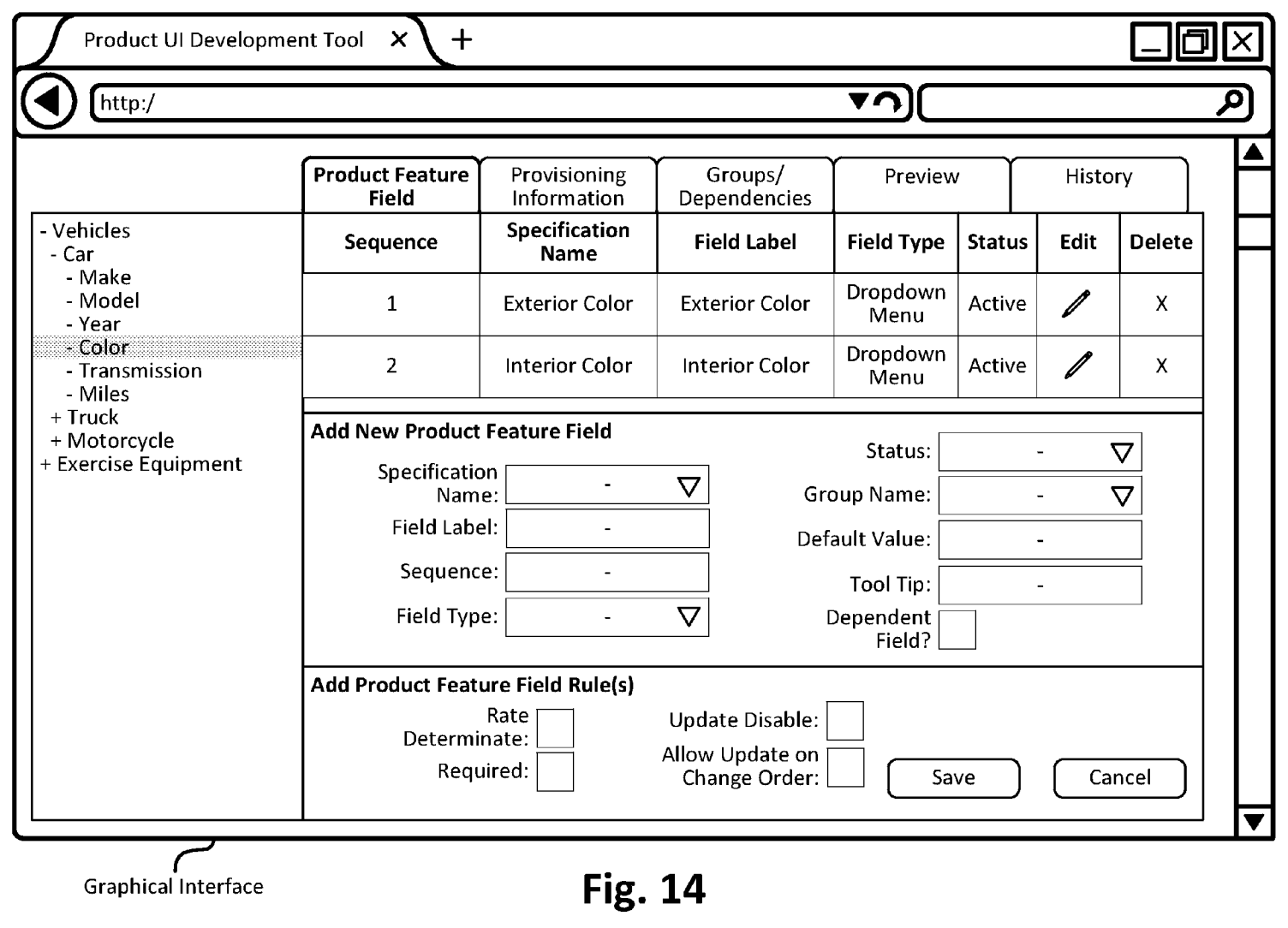

FIG. 14 illustrates an example graphical interface for defining a product feature fields within product UI development tool 225. As shown, the graphical interface may include a menu that includes one or more product groups (e.g., Vehicles, Exercise Equipment, etc.), products (e.g., Car, Truck, etc.), and product features (e.g., Make, Model, Year, etc.). The graphical interface may display a table of product feature fields corresponding to a selected product feature (e.g., Color). Each entry in the table may include one or more attributes, such as a sequence, a specification name, a field name, a filed type, a status, and/or one or more other types of product field attributes. As shown in FIG. 14, the table of product feature fields includes a product feature field for the exterior color of a car and another product feature field for the interior color of a car.

The sequence for a product feature field may determine where the product feature field is located with a product UI (e.g., a product feature field with a lower sequence value (e.g., 1) may be located, within a corresponding product UI, above another product feature field that has a higher sequence value (e.g., 2). The specification name for a product feature field may include the name of the product feature field within the product catalog. In some implementations, the specification name may operate as an identifier between the product development UI tool and the product catalog. The field label for a product feature field may include a label that will be presented for the product feature field within the product UI. The field type for a product feature field may include a type of interface object (e.g., a text box, a dropdown box, radio buttons, etc.) that will be used to present the product feature field within the product UI. The status for a product feature field may indicate whether the product feature field will be active (e.g., shown, grayed out, not shown, etc.) within the product UI. A product feature field may include additional and/or alternative attributes than those illustrated in FIG. 14.

Additionally, or alternatively, the graphical interface may provide a way to add new product feature fields to the table by specifying a sequence, a specification name, a field label, a field type, a status, and/or one or more other types of attributes for the new product feature field. In some implementations, the new product feature field may include a group name for the product feature field, which may be used to logically organize the product feature field for management purposes, for applying one or more rules to the product feature field, and/or for one or more other types of purposes.

In some implementations, the product UI development tool may operate to verify or validate one or more attributes of a new product feature field. For instance, if a user attempts to add a product feature field with a specification name that conflicts with (e.g., is the same as) the specification name of an existing product feature field, the product UI development tool may prevent the addition of the new product feature field. Additionally, or alternatively, in scenarios where a product feature will only be available at a specific location and/or a specific period of time, the product UI development tool may verify that new product feature fields with availability and/or location information cohere with the availability and/or location constraints of the product feature (which may involve information associated with the corresponding product and/or product group). In some implementations, the product UI development tool may verify or validate attributes of a product feature field in one or more ways, such as comparing the attributes of the new product feature field with attributes of existing product feature fields and/or by comparing the attributes of the new product feature field with information contained in the product catalog. In some implementations, the product UI development tool may display a message informing the user that the new product feature field was not added and/or describing the reason for not adding the new product feature field.

The graphical interface may also, or alternatively, include a way to specify one or more rules for a product feature field. For instance, if the product feature field is necessary, the user may indicate that the product feature field is required by selecting the Required checkbox. If the product feature field may be modified later (e.g., after the product or service has been initially purchased), the user may indicate that an update is allowed by selecting the Allow Update on Change Order checkbox. If the product feature field cannot be modified later (e.g., within the product UI, the user may indicate that updates are disabled by selecting the Update Disable checkbox. Additionally, or alternatively, if the product feature field will impact the final price quote of the product, the user may select the Rate Determinate checkbox. In some implementations, the Rate Determinate checkbox may already be defined in the product catalog and may not be configured by the user creating the product UI. In such implementations, the Rate Determinate checkbox may be provided in order to inform the user that the product feature field has an impact on the price of the corresponding product.

Figure 15:
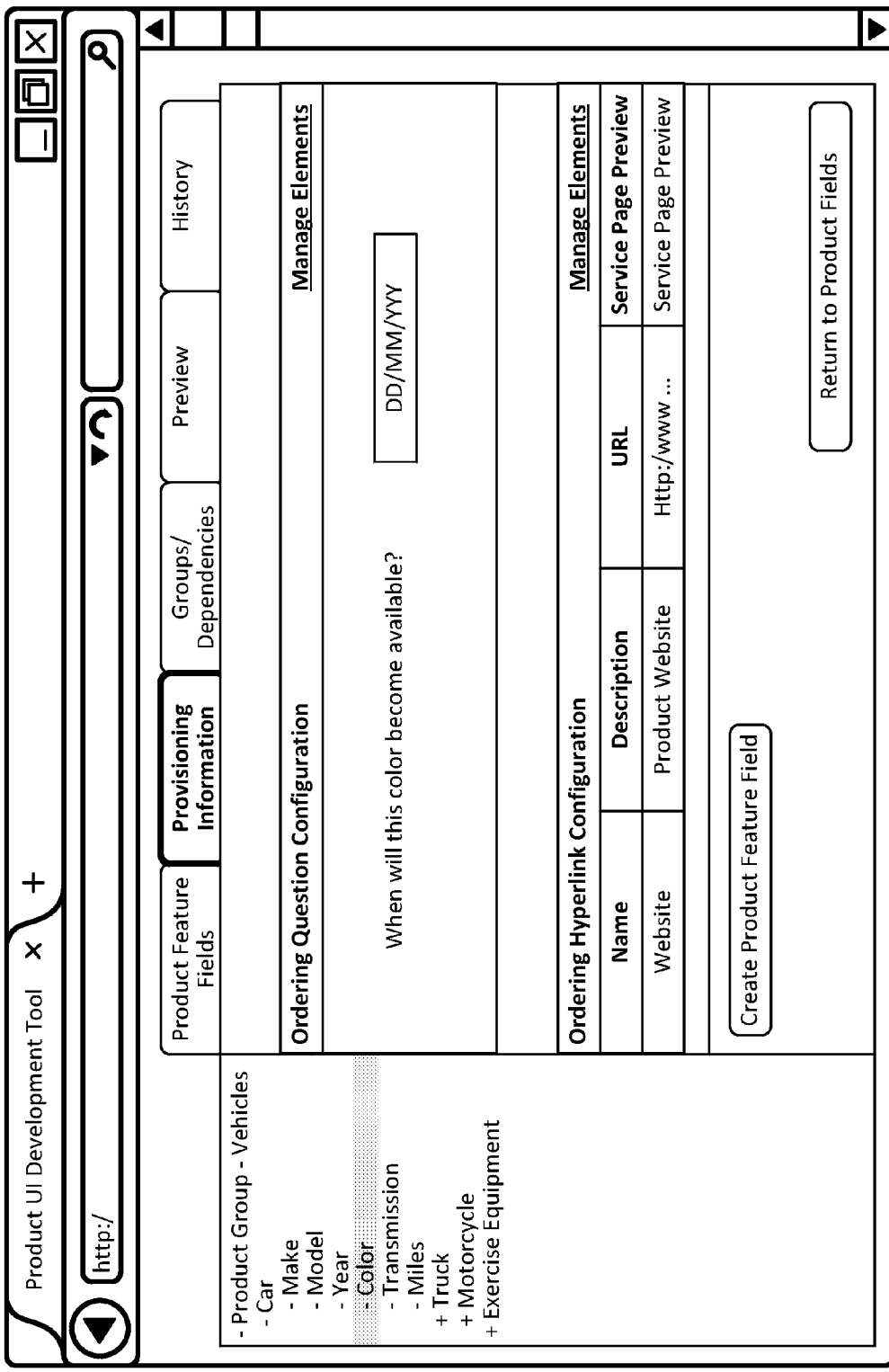
FIG. 15 illustrates an example graphical interface for defining provisioning information for product feature fields within a product UI development tool.

FIG. 15 illustrates an example graphical interface for defining provisioning information for product within product UI development tool 225. As shown, a Provisioning Information tab may include a table of product feature fields that have been added to the selected product feature (e.g., Color). For instance, the Provisioning Information tab may include a section designated for ordering questions (e.g., questions that should be answered in order to complete a sale of the product), and/or another section is designated for ordering hyperlinks (e.g., a hyperlink that describes the feature sold, conditions for selling the feature, etc.), along with Management Element links (and/or other types of interface objects) for managing the information in Provisioning Information tab.

Returning now to FIG. 3, process 300 may include creating feature field groups and feature field rules and dependencies (block 360). For example, server device 220 may create one or more product features fields that are associated with a selected product feature (e.g., Color). Each product feature field may be associated with a feature field group and/or participate in one or more feature field rules or dependencies. In some implementations, feature field groups, and/or feature field rules and dependencies may be imported from a product catalog. Additionally, or alternatively, feature field groups, and/or feature field rules or dependencies may be created by a user within product UI development tool 225.

For example, server device 220 may create feature field groups logically associate one or more product feature fields under a feature field group name. Doing so may serve one or more purposes, such as highlighting the relationships between two or more product feature fields for organizational and management purposes, creating rules or dependencies that are applicable to an entire group of product feature fields, grouping related product feature fields within a product UI, and more. Additionally, or alternatively, server device 220 may create rules and/or dependencies between two or more product features fields and/or two or more feature field groups. For example, if the Color product feature includes an Exterior product feature field and an Interior product feature field, and cars with a black exterior only come with black interiors, then a dependency may be created between the Exterior product feature field and the Interior product feature field such that when the Exterior product feature field is set to black, the Interior product feature field is automatically set to black as well. FIGS. 18-21 provide several examples of graphical interfaces that relate to creating feature field groups and feature field rules and dependencies.

Figure 16:
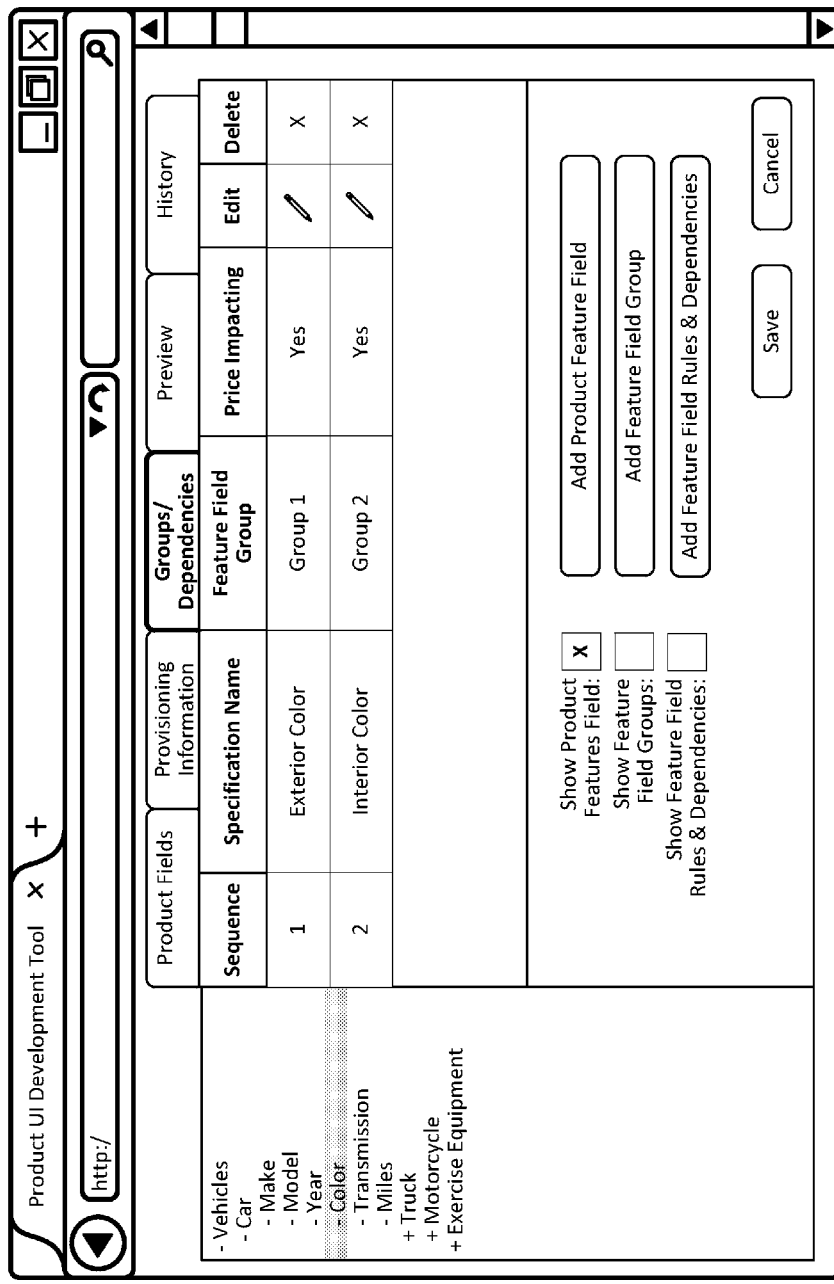
FIG. 16 illustrates an example graphical interface for displaying product feature fields within a product UI development tool.

FIG. 16 illustrates an example graphical interface for displaying product feature fields within product UI development tool 225. As shown, a Groups/Dependencies tab may include a table of product feature fields (e.g., Exterior Color, Interior Color, etc.) corresponding to a selected product feature (e.g., Color). Each entry in the table of product feature fields may include one or more of a variety of attributes, such as a sequence, a specification name, a feature field group, an indication of whether the product feature is price impacting, and/or one or more other types of attributes. The sequence of a product feature field may determine the location in which the product feature field is presented in the product UI. The specification name of a product feature field may include the name of the product feature field in the corresponding product catalog and/or a reference to a data set (e.g., a list of one or more colors) in the product catalog. The feature field group of a product feature field may include the group or category of feature fields to which the product feature field is associated, and the price impacting checkbox may indicate whether the product feature field is price impacting or non-price impacting. Organizing product feature fields into groups and/or as price impacting or non-price impacting may facilitate the product UI development process by maintain organization when a product UI includes a large number of product feature fields or in the application of rules and dependencies (e.g., some rules or dependencies may involve an entire group of product feature fields).

The Groups/Dependencies tab may also, or alternatively, include one or more checkboxes for showing product feature fields, feature field groups, and/or feature field rules and dependencies. For instance, as only the checkbox for showing product feature fields is selected in FIG. 16, the table in FIG. 16 includes only product feature fields added to the selected product feature. Additionally, or alternatively, the Groups/Dependencies tab may include buttons for adding product feature fields, adding feature field groups, and/or adding feature field rule and dependencies. Product feature fields may be added to the selected product feature in a manner that is similar or analogous to adding a product feature to a product as described above with reference to FIG. 9.

FIG. 17 illustrates an example graphical interface for displaying feature fields groups within product UI development tool 225. As shown, the Groups/Dependencies tab may include a table of product features groups (e.g., Feature Field Group 1, Feature Field Group 2, etc.) corresponding to a selected product feature (e.g., Color). Each entry in the table of feature field groups may include one or more of a variety of attributes, such as a sequence, a feature field group name, an indication of whether the feature field group is price impacting, and/or one or more other types of attributes. The sequence of a feature field group may determine the location in which the feature field group is presented in the product UI (e.g., the position of the product feature fields within the feature field group relative to product feature fields of other feature field groups). The feature field group name may include the name of the feature field group, and the price impacting checkbox may indicate whether the feature field group (e.g., the feature fields within the feature field group) is price impacting or non-price impacting.

The Groups/Dependencies tab may also, or alternatively, include one or more checkboxes for showing product features, product feature groups, and/or product feature rules. For instance, as only the checkbox for showing feature field groups is selected in FIG. 17, the table in FIG. 17 includes only feature field groups added to the selected product feature. Additionally, or alternatively, the Groups/Dependencies tab may include buttons for adding product feature fields, adding feature field groups, and/or adding feature field rules and dependencies. Feature field groups may be added to the selected product feature in a manner that is similar or analogous to adding a product feature group to a product as described above with reference to FIG. 11.

FIG. 18 illustrates an example graphical interface for displaying feature field rules and dependencies within product UI development tool 225. As shown, the Groups/Dependencies tab may include a table of feature field rules and/or dependencies corresponding to a selected product feature (e.g., Color). Each entity in the table may include one or more attributes, such as a parent specification name, a parent field value, a child specification name, a child field value, and/or one or more other type of attributes. The parent specification name may include the name of a product feature field in the product catalog that drives the feature field rule or dependency (also referred to as the parent field). The parent field value may include a value that triggers the feature field dependency described in the table. The child specification name (also referred to as the child field) may include the name of the of the product feature field in the product catalog that depends from the parent field. The child field value may include the value of the child field that is imposed upon the child field when the value of the parent field is equal to the parent field value. For instance, the feature field dependency of FIG. 18 states that the interior color of a car is black whenever the exterior color of the car is black.

In some implementations, the table of feature field rules and dependencies may include a Dependency Type attribute that indicates the type of relationship between the parent field and the child field. Examples of dependency types may include a dependency where the value of the child field is required based on a trigger value of the parent field, a dependency where the value of the child field is merely suggested based on a trigger value of the parent field, a dependency where the value of a child field must be above a minimum value, below a maximum, or within a minimum/maximum range, a dependency where the value of the child field may only be entered after the value of a parent field has been entered, a dependency where one parent field value requires the child field value to be selected from one group of child field values but another parent field value requires that the child field value be selected from another group of child field values, etc.

The Groups/Dependencies tab may also, or alternatively, include one or more checkboxes for showing product features fields, feature field groups, and/or feature field dependencies. For instance, as only the checkbox for showing feature field dependencies is selected in FIG. 18, the table in FIG. 18 includes only feature field dependencies added to the selected product feature. Additionally, or alternatively, the Groups/Dependencies tab may include buttons for adding product feature fields, adding feature field groups, and/or adding product feature dependencies.

Figure 19:
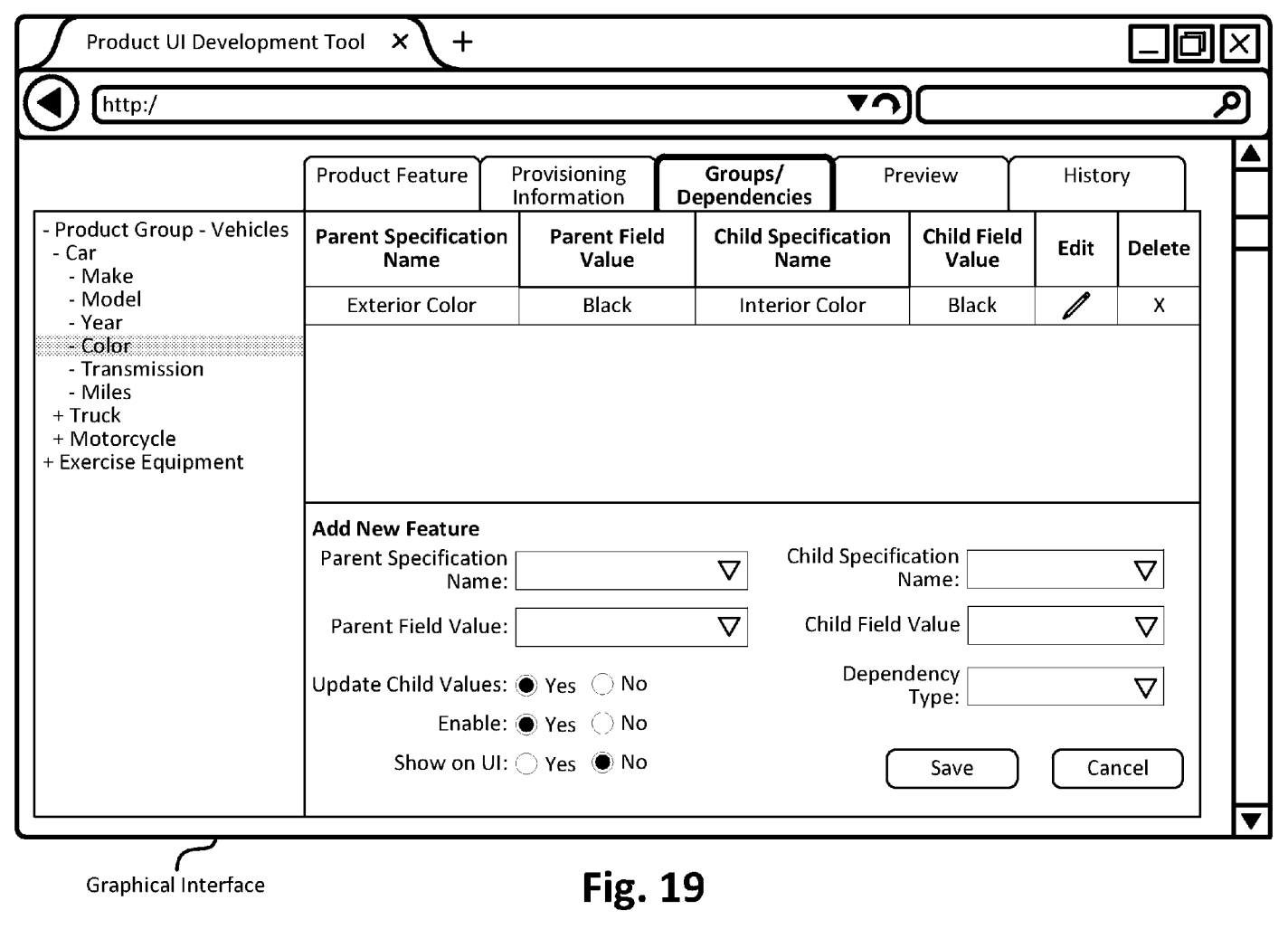

FIG. 19 illustrates an example graphical interface for adding a feature field dependency within product UI development tool 225. As shown, a new feature field dependency may be added to the product feature by specifying a parent specification name, a parent field value, a child specification name, a child field value, a dependency type, an indication of whether the child value is automatically updated, an indication of whether the product feature field is enabled, and/or an indication of whether the feature field dependency is shown in the product UI.

A parent specification name, a parent field value, a child specification name, and a child field value are described above with reference to FIG. 18. The dependency type may include whether the feature field dependency is required, optional, includes a minimum, includes a maximum, includes a range between a minimum or maximum, etc. The Update Child Values attribute may determine whether the parent field value will automatically triggers an update to the child field value. The Enable attribute may determine whether the feature field dependency is enabled or disabled. The Show on UI attribute may determine whether the feature field dependency will be noted or described in the product UI. In some implementations, adding a feature field dependency may include specifying one or more additional and/or alternative attributes than those illustrated in FIG. 19.

Returning to FIG. 3, process 300 may include generating a product UI preview and product UI history (block 370). For example, server device 220 may generate a product UI preview that may include one or more interface objects for a user to examine and test. For instance, if a user creates a dropdown box to specify the exterior color and interior color of a car, the user may cause the product UI development tool to generate a preview of the dropdown box for the exterior color, a preview of the dropdown box for the interior color, and/or a preview of the entire product UI. Additionally, or alternatively, server device 220 may generate a product UI history, which may include a record of changes made to a product UI. For instance, if a product UI already includes a radio button for whether a care is new or used, and a user later changes the radio button to a checkbox, the product UI development tool may create a record of the change. The record of the change may include a variety of information, such as the interface object that was changed, the user that made the change, the date and time of the change, etc.

Figure 20:
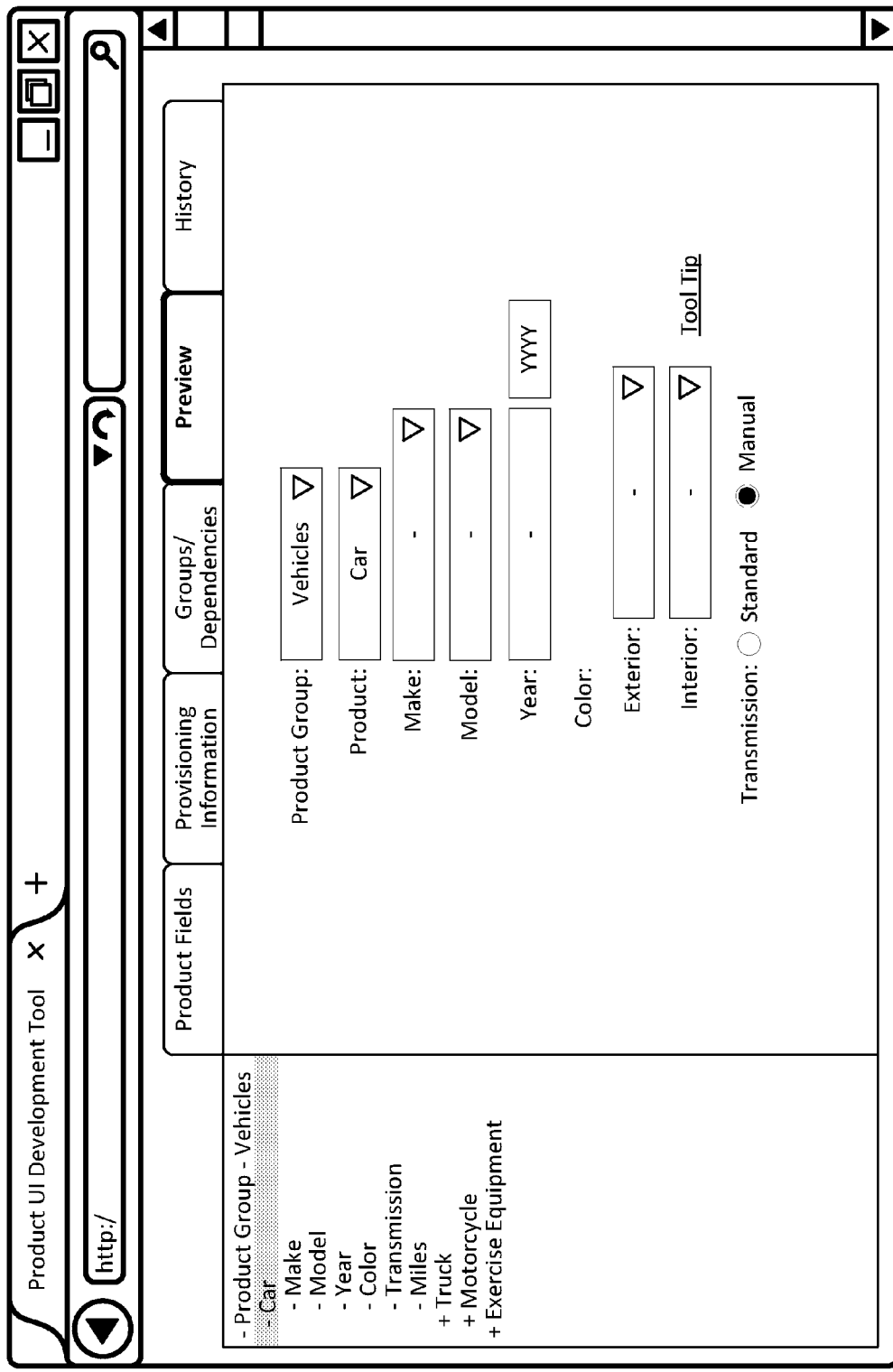
FIG. 20 illustrates an example graphical interface for previewing product fields and product feature fields within a product UI development tool.

FIG. 20 illustrates an example graphical interface for previewing product fields and product feature fields within product UI development tool 225. As shown, the product UI development tool may include a Preview tab that includes one or more product fields, such as a Product Group field, a Product field, a Make field, a Model field, a Year field, an Exterior Color field, an Interior Color field, and a Transmission field. The Preview tab may enable a user to view one or more product fields and/or product feature fields to verify whether the product fields and/or product feature fields appear and operate as intended prior to finalizing the product UI. While the Preview tab of FIG. 20 displays multiple product fields and product feature fields simultaneously, in some implementations, product fields and/or product feature fields may be previewed in a different manner, such as individually, in groups, and/or in one more other ways.

Figure 21:
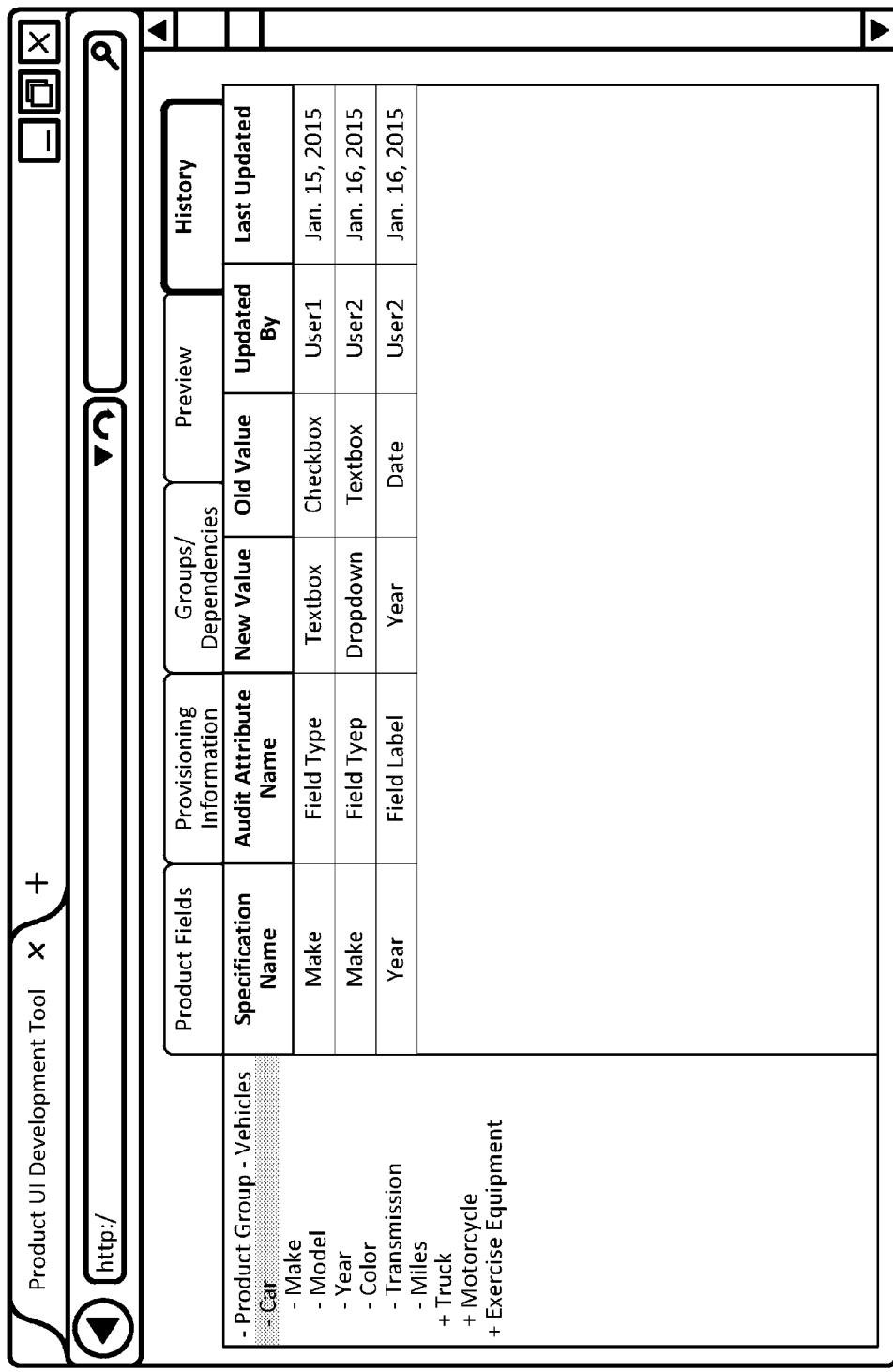
FIG. 21 illustrates an example graphical interface for tracking a product history within a product UI development tool.

FIG. 21 illustrates an example graphical interface for tracking a product history within product UI development tool 225. As shown, the product UI development tool may include a History tab that includes a table of changes made to a product (and/or product features). Each entry of the table may include one or more attributes, such as a Specification Name attribute, an Audit Attribute Name attribute, a New Value attribute, an Old Value attribute, an Updated By attribute, an Last Updated attribute, and/or one or more other types of attributes. The Specification Name attribute may refer to the product field or product feature field that was changed. The Audit Attribute Name may include the attribute of the product field or the product feature field that was updated. The New Value attribute may include the value that the attribute was changed to, the Old Value may include the value from which the attribute was changed. The Updated By attribute may include the user that implemented the change, and the Last Updated attribute may include the date on which the updated was made. In some implementations, additional and/or alternative attributes may be included in the table of FIG. 21.

Returning to FIG. 3, process 300 may include creating a product UI (block 380). For example, server device 220 may create a product UI using the product UI development tool. In some implementations, creating the product UI may include generating an interface that includes one or more of the product fields, product feature fields, and/or rules and dependencies corresponding to a product defined in the product UI development tool. Additionally, or alternatively, creating the product UI may include deploying or otherwise making the product UI available to an enterprise software program. In certain implementations, product fields, product feature fields, and/or rules and dependencies for a particular product may be made available to certain portions of an enterprise software program in addition to a product UI. For instance, a product field that describes a product may become available in an interface for billing so as to indicate the product to which the billing pertains.

FIG. 22 illustrates an example product UI. As shown, the product UI may include one or more sections, such as a product section and a product configuration section The product section may include one or more product fields (e.g., the Product Type field, the Product field, etc.), and the product configuration section may include product feature fields (e.g., the Make field, the Model field, etc.). However, the product UI of FIG. 22 is only one example of a product UI, and in other implementations, a Product UI may include a different quantity and/or arrangement of product sections, product fields, and/or product feature fields. In some implementations, the product UI may include one or more rules and/or dependencies involving one or more of the product fields and/or feature fields of the Product UI.

Assume that the product UI is intended for the purchase of a car that will be delivered to a company engaged in the business of selling cars. The Product Section may include a field for specifying a product type, a product, a quantity, a company website, delivery business hours, and/or one or more other types of attributes. The Product Type field may include a dropdown menu of products for sale, such as vehicles, exercise equipment, and/or one or more other types of products. The Product field may include a dropdown menu of products that depends on the Product Type field. For instance, since the Product Type field is set to vehicles, the dropdown menu may include cars, trucks, motorcycles, and/or one or more other types of vehicles. The Quantity field may be a textbox for indicating the number of cars being purchased. The Product Website field may include a hyperlink to a webpage that details one or more of the selected products (e.g., Car) for sale, and the Business Hours for Delivery may indicate the acceptable times for delivering the product to the buyer.

The Product Configuration Section may include a Make field, a Model field, a Year field, an Exterior Color field, and Interior Color field, a Transmission field, a New or Used field, and a Miles field. The Make field may include a dropdown menu of car manufacturers (e.g., Ford, Toyota, Honda, etc.). The Make field may be dependent on the Product field. For instance, the Make field may only be shown and/or populated with car manufacturers if a user selects Cars from for the Product field. The Model field may include a dropdown menu of car models (e.g., Civic, Accord, etc.). The Model field may be dependent upon the Make field. For instance, if the Make field includes a particular car manufacturer (e.g., Honda), then the Model field may only include car models that are manufactured by Honda. The Year field may include a text box for inputting the year of the car being purchased. The Year field may include a tool tip indicating the format for the Year field (e.g., YYYY). As such, if the car being purchased was manufactured in 2008, the user would know to enter the year as 2008 and not simply 08.

The Color field may be divided into two different fields, an Exterior field and an Interior filed. The Exterior field may include a dropdown menu of available exterior colors for the car. Likewise, the Interior field may include a dropdown menu of available interior colors. In some implementations, one color may be dependent upon another color. For instance, if cars that have a block exterior only come with a black interior, then if a user sets the Exterior field to black, then the Product UI may automatically set the Interior field to black as well. As shown in FIG. 22, a tool tip may be provided to inform the user that the Interior field has been automatically selected due to the limits on interior colors for cars with black exteriors.

The Transmission field may include radio buttons for selecting whether the transmission for the car is standard or manual. Similarly, the New or Used field includes radio buttons to specify whether the car being sold is new or used. The Miles field may include a textbox for inputting the mileage of a car. The textbox may include certain rules, such as a rule to only accept certain symbols (e.g., numbers only), a rule to only accept a certain format of numeric symbols (e.g., 1,000, instead of 1000), a rule to only accept numbers that are within a range of number (e.g., 0 miles and 300,000 miles), and/or one or more other types of rules.

Figure 23:
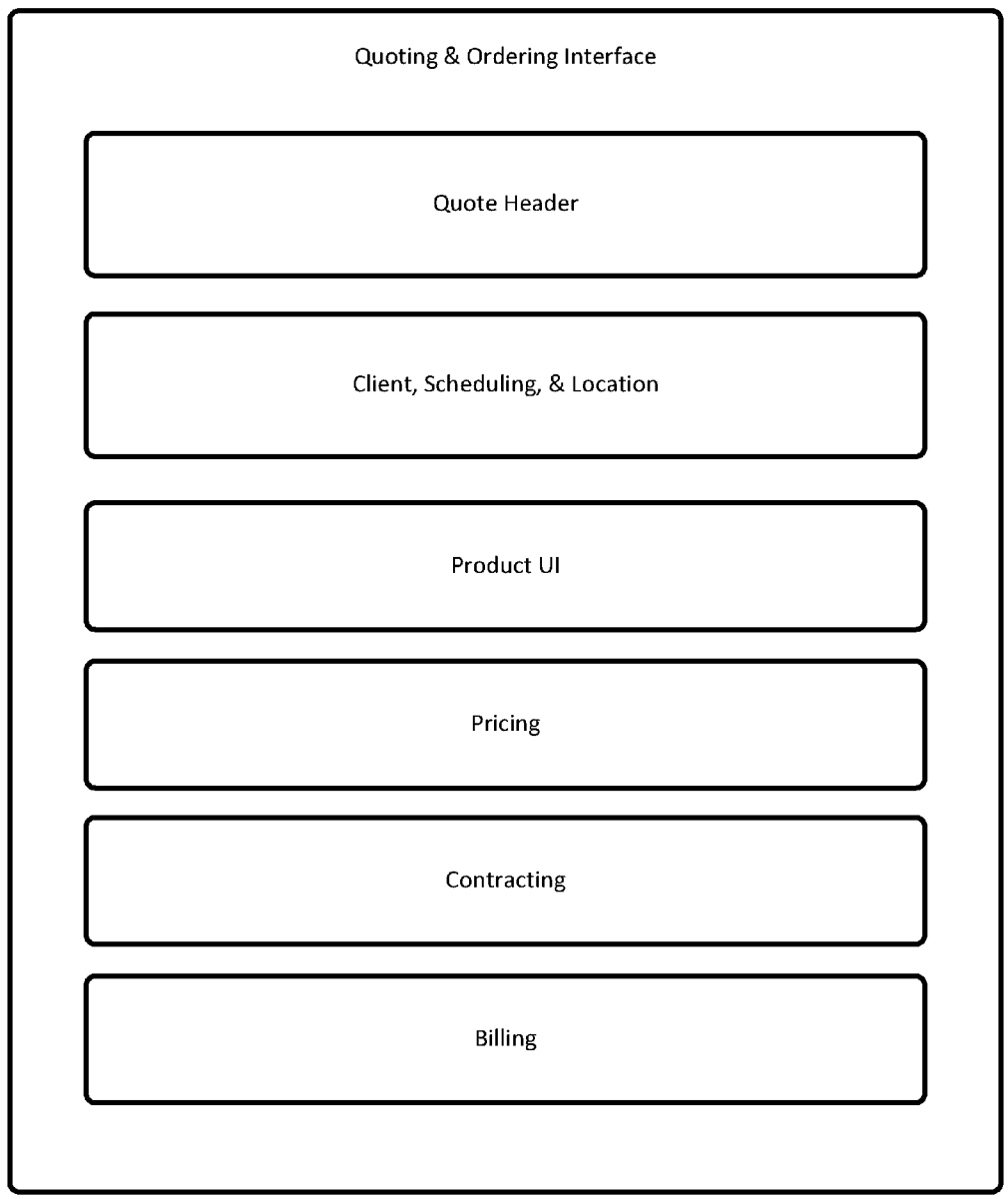
FIG. 23 illustrates an example quoting and ordering interface.

FIG. 23 illustrates an example quoting and ordering interface. The quoting and ordering interface may be part of an enterprise software program capable of taking orders, determining product prices and contracting, completing orders and billings, and/or performing one or more other types of tasks. While the quoting and ordering interface may include a wide variety of sections, the quoting and ordering interface illustrated in FIG. 23 includes a Quote Header section, a Client, Scheduling, & Location section, a Product UI section, a Pricing section, a Contracting section, and a Billing section. Each section may include one or more interface objects, such as titles, descriptions, textboxes, checkboxes, dropdown boxes, radio buttons, and/or one or more other types of interface objects.

For instance, the Quote Header section may include a quote name, a client name, a client number, an indication of whether the quote is for a product or service, etc. The Client, Scheduling, & Location section may include options for identifying a client for which the product is intended (whether by entering new client information or selecting from a list of existing clients) and/or determining a time and place for offering and/or delivering the product to the client. The Product UI section may include one or more products and/or product features that can be configured by a user based on the products and product features defined using Product UI development tool 225. The Pricing section may include one or more options for pricing the product, such as the product price, sales and/or discount information, payment information, interest rates, number of payments, duration between payments etc. The Contracting section may include one or more legal provisions supporting the sale and/or delivery of the product defined in the Product UI section. The Billing section may include information (e.g., names, addresses, account numbers, etc.) for billing the individual or organization purchasing the product defined in the Product UI.

While FIG. 3 shows a flowchart diagram of an example process 300 for developing a product UI, in other implementations, a process for developing a product UI may include fewer operations, different operations, differently arranged operations, and/or additional operations than depicted in FIG. 3. In addition, while FIGS. 4-25 show example implementations with various features and information, in other implementations, example implementations may include fewer features and information, different features and information, differently arranged features and information, and/or additional features and information than the features and information depicted in FIGS. 4-24.

Figure 24:
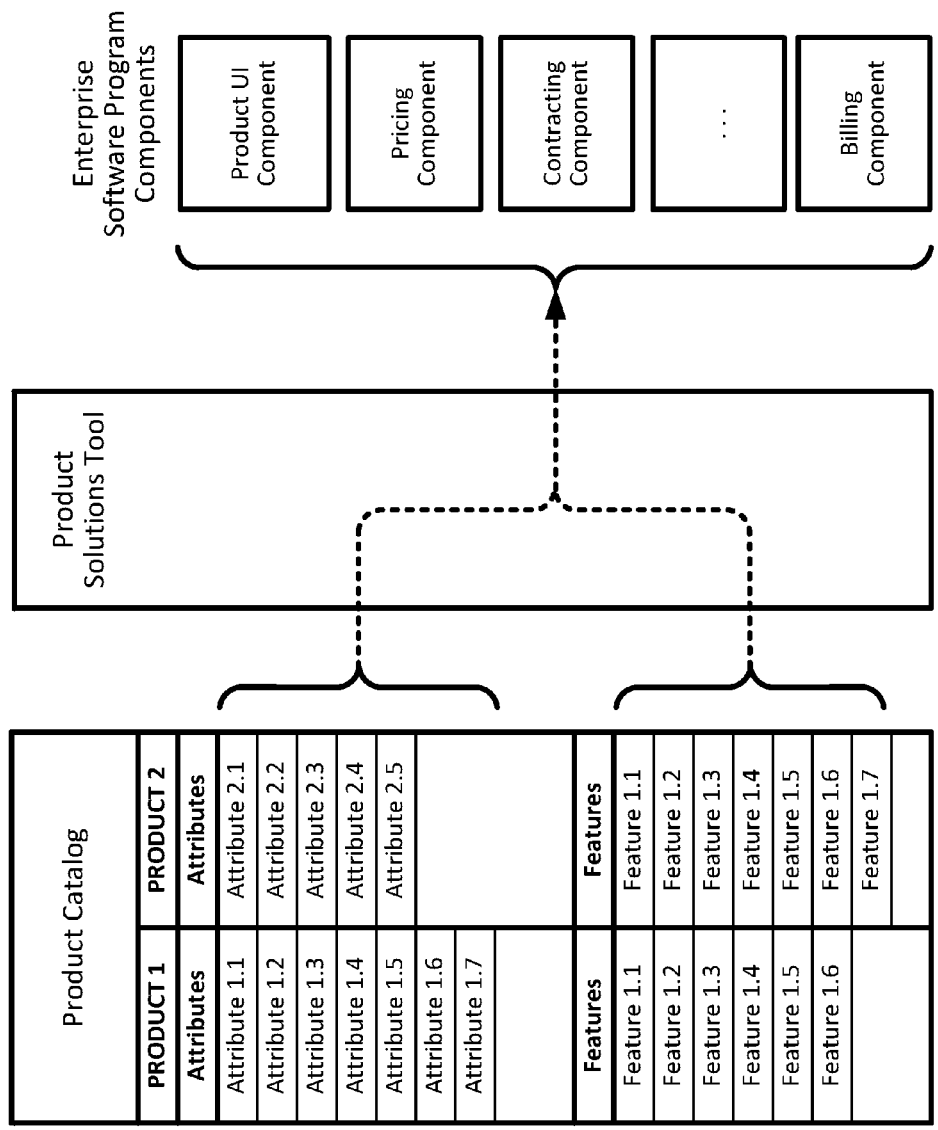
FIG. 24 illustrates a block diagram of an example product catalog in combination with a product UI development tool and a quoting and ordering interface.

FIG. 24 illustrates a block diagram of product solutions tool in combination with a product catalog and components of an enterprise software program. As shown, the product catalog may include multiple products (e.g., Product 1, Product 2, etc.) that each include product attributes (e.g., Attribute 1.1, Attribute 1.2, etc.) and product features (e.g., Feature 1.1, Feature 1.2, etc.). A user may use the product catalog for creating and defining products, product attributes, and product feature, each with their own identifier and parameters for extraction from the product catalog and implementation within the enterprise software program.

The product solutions tool may include one or more of the features and tools described herein, such as product UI development tool 225, in addition to other types of development tools for allocating and configuring products, product attributes, and product feature from the product catalog to the components of the enterprise software program. The enterprise software program components may include a product UI component, a pricing component, a contracting component, a billing component, and/or other types of components. Each component of the enterprise software program may include a UI for presenting information to a user and/or receiving information from the user, in addition to rules and information for interacting with the product solutions tool and performing its own functions within the context of the enterprise software program.

A product attribute may include a characteristic of a type of product or a type of transaction relating to a product. For instance, a product attribute may include a product type, a product title, a model number, a buyer name, a buyer address, a seller name, a seller address, etc. As shown, a user may use the product solutions tool to allocate products and product attributes to one or more of the components of the enterprise software program. For instance, a user may allocate text boxes for a buyer name, a buyer address, a seller name, and a seller address to the contracting component and the billing component. Similarly, a user may allocate a product type, a product title, and a model number for a product to the product UI component and the pricing component. As such, the user may adapt the product attributes within the product catalog to one or more of the components of the enterprise software program. Additionally, depending on the scenario, a product attribute may, or may not, require human interacting within the enterprise software program. For instance, some product attributes may include a title or phrase that is directly allocated from the product catalog to a particular component of the enterprise software program, whereas other product attributes may require a user input such as a user typing into a text box, selecting a check box, etc.

The product features in the product catalog may include a list the features that may be shown in the product UI component, as well as the other features that may be shown in other components (e.g., the contracting component, the billing component, etc.). In some implementations, product features may include characteristics of a product that are more complex than characteristics represented by product attributes. For instance, a product attribute may include a text box for inputting a name of a buyer or a seller, whereas a product feature may include a more complex characteristics with dropdown menus, parent/child relationships, etc. (in terms of UI interface objects), some of which may be further configurable with the product solutions tool as described above with reference to product UI development tool 225.

As an example, if the product is a car, then product features of the car may include the Make of the car (e.g., Honda, Ford, Toyota, etc.), the Model of the car (e.g., Accord, Civic, etc.), the Year the car was manufactured (e.g., 2012, 2013, 2014, etc.), the Color of the car (e.g., red, blue, green, etc.), and other characteristics useful for defining a particular car. A user may use the product solutions tool to allocate the product features to one or more components of the enterprise software program. For example, as discussed herein, product features may be imported into product UI development tool 225 and assigned rules and dependencies in order to create a product UI that includes various fields (e.g., text boxes, dropdown menus, check boxes, etc.) that enable a user to specify a product for a product order.

In addition, a user may use the product solutions tool to specify product features for other portions of the enterprise software program as well. As one example, a user may, with the product solutions tool, incorporate a product identifier into the pricing component in order to identify the product being priced. As another example, a user may incorporate a service duration into the contracting component to enable a user to specify the duration for which a particular service shall be provided. As yet another example, a user may incorporate a product warranty attribute into the billing component in order to enable a user to generate an accurate billing amount when a product warrant is sold along with a product. In some implementations, product features may be defined within the product catalog by feature attributes or sub-features, which may be similar in nature and arrangement to the manner in which a product may include product attributes and product features. Depending on the scenario, the feature attribute or sub-feature may, or may not, require human interaction within the enterprise software program. Additionally, a user may also have such feature attributes or sub-features incorporated into one or more of the components of the enterprise software program.

Figure 25:
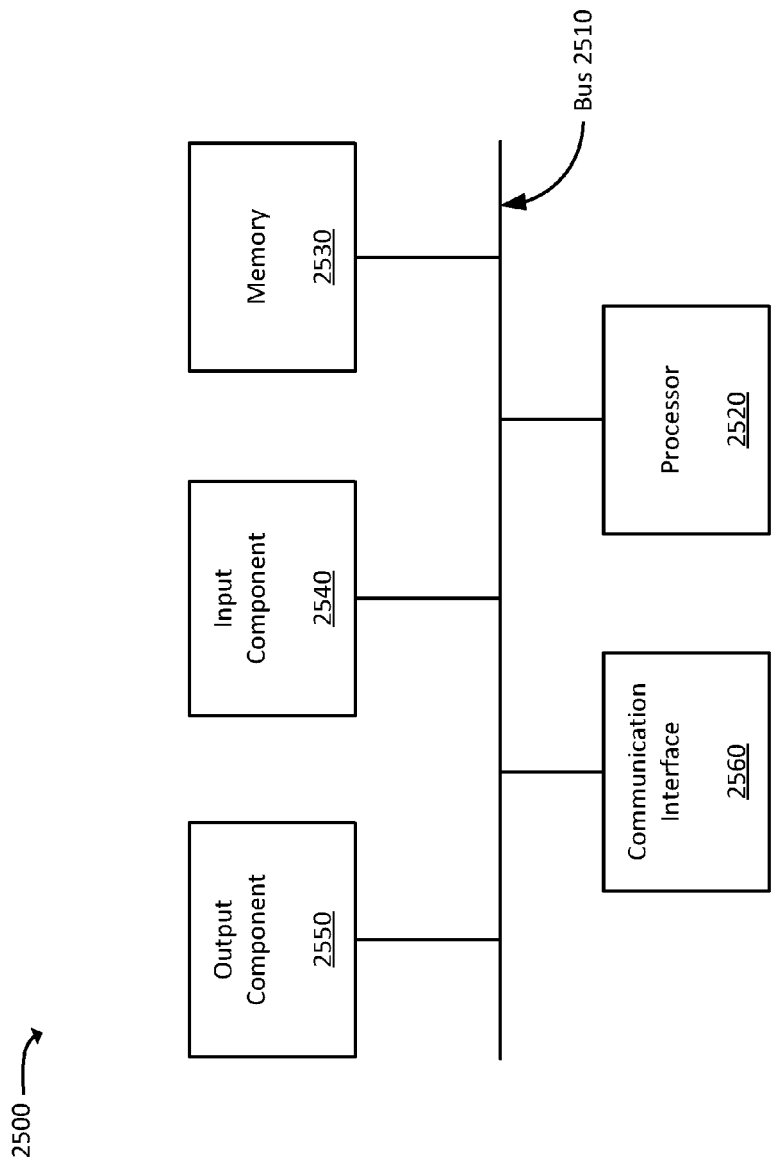
FIG. 25 illustrates example components of one or more devices, according to one or more implementations described herein.

FIG. 25 illustrates example components of one or more devices, according to one or more implementations described herein. One or more of the devices described above (e.g., with respect to FIGS. 1 and 2) may include one or more devices 2500. Device 2500 may include bus 2510, processor 2520, memory 2530, input component 2540, output component 2550, and communication interface 2560. In another implementation, device 2500 may include additional, fewer, different, or differently arranged components.

Bus 2510 may include one or more communication paths that permit communication among the components of device 2500. Processor 2520 may include a processor, microprocessor, or processing logic that may interpret and execute instructions. Memory 2530 may include any type of dynamic storage device that may store information and instructions for execution by processor 2520, and/or any type of non-volatile storage device that may store information for use by processor 2520.

Input component 2540 may include a mechanism that permits an operator to input information to device 2500, such as a keyboard, a keypad, a button, a switch, etc. Output component 2550 may include a mechanism that outputs information to the operator, such as a display, a speaker, one or more light emitting diodes (LEDs), etc.

Communication interface 2560 may include any transceiver-like mechanism that enables device 2500 to communicate with other devices and/or systems. For example, communication interface 2560 may include an Ethernet interface, an optical interface, a coaxial interface, or the like. Communication interface 2560 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 2500 may include more than one communication interface 2560. For instance, device 2500 may include an optical interface and an Ethernet interface.

Device 2500 may perform certain operations relating to one or more processes described above. Device 2500 may perform these operations in response to processor 2520 executing software instructions stored in a computer-readable medium, such as memory 2530. A computer-readable medium may be defined as a non-transitory memory device. A memory device may include space within a single physical memory device or spread across multiple physical memory devices. The software instructions may be read into memory 2530 from another computer-readable medium or from another device. The software instructions stored in memory 2530 may cause processor 2520 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to one or more figures described herein, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIG. 2), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method implemented by a computing device, the method comprising:
    obtaining, by the computing device and from a product catalog, information describing a plurality of products for sale, each product of the plurality of products being defined by a plurality of attributes within the product catalog;
    displaying, by the computing device, and to a user via a user interface, the information describing the products;
    receiving, by the computing device and in response to displaying the information, an indication of one or more graphical interface objects to represent each product of the plurality of products;
    receiving, by the computing device, dependency information that specifies that a first attribute, of the plurality of attributes, is a parent attribute with respect to a second attribute, of the plurality of attributes,
        wherein the dependency information specifies a first set of values for the second attribute, out of a plurality of possible values, that are associated with a first value for the first attribute,
        wherein the dependency information specifies a second set of values for the second attribute, out of the plurality of possible values, that are associated with a second value for the first attribute, wherein the first and second sets of values are different sets of values;
    associating the indicated one or more graphical interface objects with the plurality of products;
    generating, by the computing device and based on the dependency information, a product user interface that includes the graphical interface objects in a manner that represents the plurality of products,
        wherein the generated product user interface includes a first graphical interface object to specify a value for the first attribute, and further includes a second graphical interface object to select a value for the second attribute,
        wherein when the first value is specified for the first attribute, the second graphical interface object allows selection from a first list that includes only the first set of values, and
        wherein when the second value is specified for the first attribute, the second graphical interface object allows selection from a second list that includes only the second set of values; and
    incorporating, by the computing device, the product user interface within an enterprise software program configured to make the product user interface available to users for purchase of each product of the plurality of products, in addition to determine pricing for each sale of each product, generate a contract for each sale of each product, and provide a billing service for each sale of each product.

2. The method of claim 1, wherein the indicated one or more graphical interface objects comprise positioning information to position each of the one or more graphical interface objects within the product user interface.

3. The method of claim 1, further comprising:
    automatically checking whether a graphical interface object indicating an availability date of a product of the plurality of products is consistent with an availability date attribute of the product according to the product catalog.

4. The method of claim 1, further comprising:
    automatically checking whether a graphical interface object associated with an availability location of a product of the plurality of products is consistent with an availability location attribute of the product according to the product catalog.

5. The method of claim 1, further comprising:
    automatically verifying that an identifier of an interface object indicated by the user does not conflict with an identifier of a corresponding product according to the product catalog.

6. The method of claim 1, further comprising:
    receiving a request from the user via the user interface to preview the product user interface prior to incorporating the product user interface within the enterprise software program;
    creating a preview of the product user interface based on the information describing the plurality of products and the graphical interface objects; and
    displaying the preview to the user via the user interface.

7. The method of claim 1, further comprising:
    recording changes to the product user interface within the user interface;
    receiving a request from the user to view a history of changes to the product user interface; and
    displaying the history of the changes made to the product user interface within the user interface.

8. A computing device comprising:
a non-transitory memory device storing a plurality of processor-executable instructions; and
one or more processors configured to execute the processor-executable instructions, wherein executing the processor-executable instructions causes the one or more processors to:
obtain, from a product catalog, information describing a plurality of products for sale, each product of the plurality of products being defined by a plurality of attributes within the product catalog;
display, to a user via a user interface, the information describing the products;
receive, in response to displaying the information, an indication of one or more graphical interface objects to represent each product of the plurality of products;
receive dependency information that specifies that a first attribute, of the plurality of attributes, is a parent attribute with respect to a second attribute, of the plurality of attributes,
wherein the dependency information specifies a first set of values for the second attribute, out of a plurality of possible values, that are associated with a first value for the first attribute,
wherein the dependency information specifies a second set of values for the second attribute, out of the plurality of possible values, that are associated with a second value for the first attribute, wherein the first and second sets of values are different sets of values;
associate the indicated one or more graphical interface objects with the plurality of products;
generate, based on the dependency information, a product user interface that includes the graphical interface objects in a manner that represents the plurality of products,
wherein the generated product user interface includes a first graphical interface object to specify a value for the first attribute, and further includes a second graphical interface object to select a value for the second attribute,
wherein when the first value is specified for the first attribute, the second graphical interface object allows selection from a first list that includes only the first set of values, and
wherein when the second value is specified for the first attribute, the second graphical interface object allows selection from a second list that includes only the second set of values; and
incorporate the product user interface within an enterprise software program configured to make the product user interface available to users for purchase of each product of the plurality of products, in addition to determine pricing for each sale of each product, generate a contract for each sale of each product, and provide a billing service for each sale of each product.

9. The computing device of claim 8, wherein the indicated one or more graphical interface objects comprise positioning information to position each of the one or more graphical interface objects within the product user interface.

10. The computing device of claim 8, wherein executing the processor-executable instructions causes the one or more processors further to:
automatically check whether a graphical interface object indicating an availability date of a product of the plurality of products is consistent with an availability date attribute of the product according to the product catalog.

11. The computing device of claim 8, wherein executing the processor-executable instructions causes the one or more processors further to:
automatically check whether a graphical interface object associated with an availability location of a product of the plurality of products is consistent with an availability location attribute of the product according to the product catalog.

12. The computing device of claim 8, wherein executing the processor-executable instructions causes the one or more processors further to:
automatically verify that an identifier of an interface object indicated by the user does not conflict with an identifier of a corresponding product according to the product catalog.

13. The computing device of claim 8, wherein executing the processor-executable instructions causes the one or more processors further to:
receive a request from the user via the user interface to preview the product user interface prior to incorporating the product user interface within the enterprise software program;
create a preview of the product user interface based on the information describing the plurality of products and the graphical interface objects; and
display the preview to the user via the user interface.

14. The computing device of claim 8, wherein executing the processor-executable instructions causes the one or more processors further to:
record changes to the product user interface within the user interface;
receive a request from the user to view a history of changes to the product user interface; and
displaying the history of the changes made to the product user interface within the user interface.

15. The computing device of claim 8, wherein the product catalog and the user interface are part of the enterprise software program for selling the plurality of products.

16. A computing device comprising:
a non-transitory memory device storing a plurality of processor-executable instructions; and
one or more processors configured to execute the processor-executable instructions, wherein executing the processor-executable instructions causes the one or more processors to:
provide a graphical user interface for developing product user interfaces, the graphical user interface including information describing at least one product for sale from a product catalog, the at least one product being associated with a plurality of attributes within the product catalog;
receive dependency information that specifies that a first attribute, of the plurality of attributes, is a parent attribute with respect to a second attribute, of the plurality of attributes,
wherein the dependency information specifies a first set of values for the second attribute, out of a plurality of possible values, that are associated with a first value for the first attribute,
wherein the dependency information specifies a second set of values for the second attribute, out of the plurality of possible values, that are associated with a second value for the first attribute, wherein the first and second sets of values are different sets of values;

receive an indication of a plurality of graphical interface objects to use in representing the at least one product; and generate, based on the dependency information and within an enterprise software program for selling the at least one product, a product user interface capable of representing the at least one product, the product user interface including the plurality of graphical interface objects and the enterprise software program being configured to determine pricing, generate a contract, and provide a billing service for each sale of the at least one product, wherein the generated product user interface includes a first graphical interface object, of the plurality of graphical interface objects, to specify a value for the first attribute, and further includes a second graphical interface object, of the plurality of graphical interface objects, to select a value for the second attribute, wherein when the first value is specified for the first attribute, the second graphical interface object allows selection from a first list that includes only the first set of values, and wherein when the second value is specified for the first attribute, the second graphical interface object allows selection from a second list that includes only the second set of values.

17. The computing device of claim 16, wherein the indication of the plurality of graphical interface objects comprises positioning information to position the plurality of graphical interface objects within the product user interface.

18. The computing device of claim 16, wherein executing the processor-executable instructions causes the one or more processors further to:

automatically check whether a graphical interface object indicating an availability date of a product of the at least one product is consistent with an availability date attribute of the product according to the product catalog.

19. The computing device of claim 16, wherein executing the processor-executable instructions causes the one or more processors further to:

automatically check whether a graphical interface object associated with an availability location of a product of the at least one product is consistent with an availability location attribute of the product according to the product catalog.

20. The computing device of claim 16, wherein executing the processor-executable instructions causes the one or more processors further to: automatically verify that an identifier of an interface object does not conflict with an identifier of the at least one product according to the product catalog.

* * * * *